(12) United States Patent  
Honda

(10) Patent No.: US 7,284,003 B2  
(45) Date of Patent: Oct. 16, 2007

(54) PRODUCT LIFECYCLE DATA MANAGEMENT SYSTEM AND PRODUCT LIFECYCLE DATA MANAGEMENT METHOD

(75) Inventor: Hajime Honda, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 10/944,217

(22) Filed: Sep. 17, 2004

(65) Prior Publication Data

US 2005/0065971 A1 Mar. 24, 2005

(30) Foreign Application Priority Data

Sep. 19, 2003 (JP) ............................ 2003-329001

(51) Int. Cl.  
*G06F 17/30* (2006.01)
(52) U.S. Cl. ............................. 707/10; 707/9; 707/204
(58) Field of Classification Search ................ 707/10, 707/9, 204  
See application file for complete search history.

(56) References Cited

U.S. PATENT DOCUMENTS

| 2002/0139846 A1* | 10/2002 | Needham et al. ............ 235/383 |
| 2003/0120745 A1* | 6/2003 | Katagishi et al. ............ 709/217 |
| 2006/0119471 A1* | 6/2006 | Rudolph et al. ........... 340/10.41 |
| 2007/0112676 A1* | 5/2007 | Kontio et al. ................ 705/50 |

FOREIGN PATENT DOCUMENTS

JP 2000-048066 2/2000

OTHER PUBLICATIONS

Bajic et al. "Auto-ID mobile information system for vehicle life cycle data management." Oct. 6-9, 2002. IEEE, Volumn 4, pp. 1-6. Retrieved Dec. 28, 2006 from <http://ieeexplore.ieee.org/iel5/8325/26298/01173318.pdf?isnumber=&arnumber=1173318>.*  
Strowbridge, "The implications of E-business for product lifecycle management", IEEE, 2000, pp. 4/1-4/13.*

* cited by examiner

*Primary Examiner*—Thuy Pardo  
(74) *Attorney, Agent, or Firm*—Carrier, Blackman & Associates, P.C.; Joseph P. Carrier; William D. Blackman

(57) ABSTRACT

A product lifecycle data management system includes a data processing terminal, a memory medium and a management server. The data processing terminal receives a first ID and a product related data; transmits the first ID and the product related data to the memory medium. The memory medium compares the first ID with a previously stored second ID; stores the product related data when the first ID is the same as the second ID; and transmits the first process ending data and a first key data corresponding to the second ID previously stored. The data processing terminal transmits the first ID, the product related data and a first key data to the management server. The management server transmits a second process ending data to the data processing terminal, when the first ID and the first key data are the same as a third ID and a second key data stored previously.

17 Claims, 17 Drawing Sheets

Fig. 7

| 51 → BODY NUMBER | |
|---|---|
| 52 → WRITING KEY CODE | |

53 →

| PRODUCTION PART DATA | |
|---|---|
| PRODUCT NAME/TYPE | |
| MANUFACTURE DATE | |
| FACTORY | |
| REPAIRING | |
| SHIPPING DATE | |
| ⋮ | |

54 →

| DISTRIBUTION PART DATA | | | |
|---|---|---|---|
| FIRST DISTRIBUTION HUB | | SECOND DISTRIBUTION HUB | ⋯ |
| TRANSPORTATION COMPANY | | TRANSPORTATION COMPANY | |
| SHIPPING ROUTE | | SHIPPING ROUTE | |
| SHIPPING DATE | | SHIPPING DATE | |
| LOADED DATE | | LOADED DATE | |
| ⋮ | | ⋮ | |

55 →

| SALES AND SERVICE PART DATA | | | |
|---|---|---|---|
| FIRST SALES AND SERVICE HUB | | SECOND SALES AND SERVICE HUB | ⋯ |
| RETAILER | | RETAILER | |
| SALES DAY | | SALES DAY | |
| REPAIR DAY | | REPAIR DAY | |
| REPAIRING | | REPAIRING | |
| ⋮ | | ⋮ | |

56 →

| DISCARDING AND RECYCLING PART DATA | | | |
|---|---|---|---|
| FIRST DISCARDING AND RECYCLING HUB | | SECOND DISCARDING AND RECYCLING HUB | ⋯ |
| COLLECTION TRADER | | COLLECTION TRADER | |
| COLLECTION DAY | | COLLECTION DAY | |
| DISCARDING TRADER | | DISCARDING TRADER | |
| DISCARDING DAY | | DISCARDING DAY | |
| ⋮ | | ⋮ | |

Fig. 8

| BODY NUMBER | WRITING KEY CODE | PRODUCT NAME/TYPE | MANUFACTURE DATE | FACTORY | REPAIRING | SHIPPING DATE | ...... |
|---|---|---|---|---|---|---|---|
| ****** | ******* | ****** | ****** | ****** | ****** | ****** | ****** |
| ****** | ******* | ****** | ****** | ****** | ****** | ****** | ****** |
| ****** | ******* | ****** | ****** | ****** | ****** | ****** | ****** |
| ****** | ******* | ****** | ****** | ****** | ****** | ****** | ****** |

Fig. 9

| BODY NUMBER | WRITING KEY CODE | TRANSPORTATION COMPANY | SHIPPING ROUTE | SHIPPING DATE | LOADED DATE | ...... |
|---|---|---|---|---|---|---|
| ****** | ******* | ****** | ******* | ******* | ******* | ****** |
| ******* | ******* | ****** | ****** | ****** | ****** | ****** |
| ******* | ******* | ****** | ****** | ****** | ****** | ****** |
| ****** | ****** | ***** | ****** | ****** | ****** | ***** |

Fig. 10

| BODY NUMBER | WRITING KEY CODE | RETAILER | SALES DAY | REPAIR DAY | REPAIRING | ...... |
|---|---|---|---|---|---|---|
| ****** | ******* | ****** | ****** | ****** | ****** | ****** |
| ****** | ******* | ****** | ****** | ****** | ****** | ****** |
| ****** | ******* | ****** | ****** | ****** | ****** | ****** |
| ****** | ******* | ****** | ****** | ****** | ****** | ****** |

Fig. 11

| BODY NUMBER | WRITING KEY CODE | COLLECTION TRADER | COLLECTION DAY | DISCARDING TRADER | DISCARDING DAY | ...... |
|---|---|---|---|---|---|---|
| ****** | ****** | ****** | ****** | ****** | ****** | ****** |
| ****** | ****** | ****** | ****** | ****** | ****** | ****** |
| ****** | ****** | ****** | ****** | ****** | ****** | ****** |
| ****** | ****** | ****** | ****** | ****** | ****** | ****** |

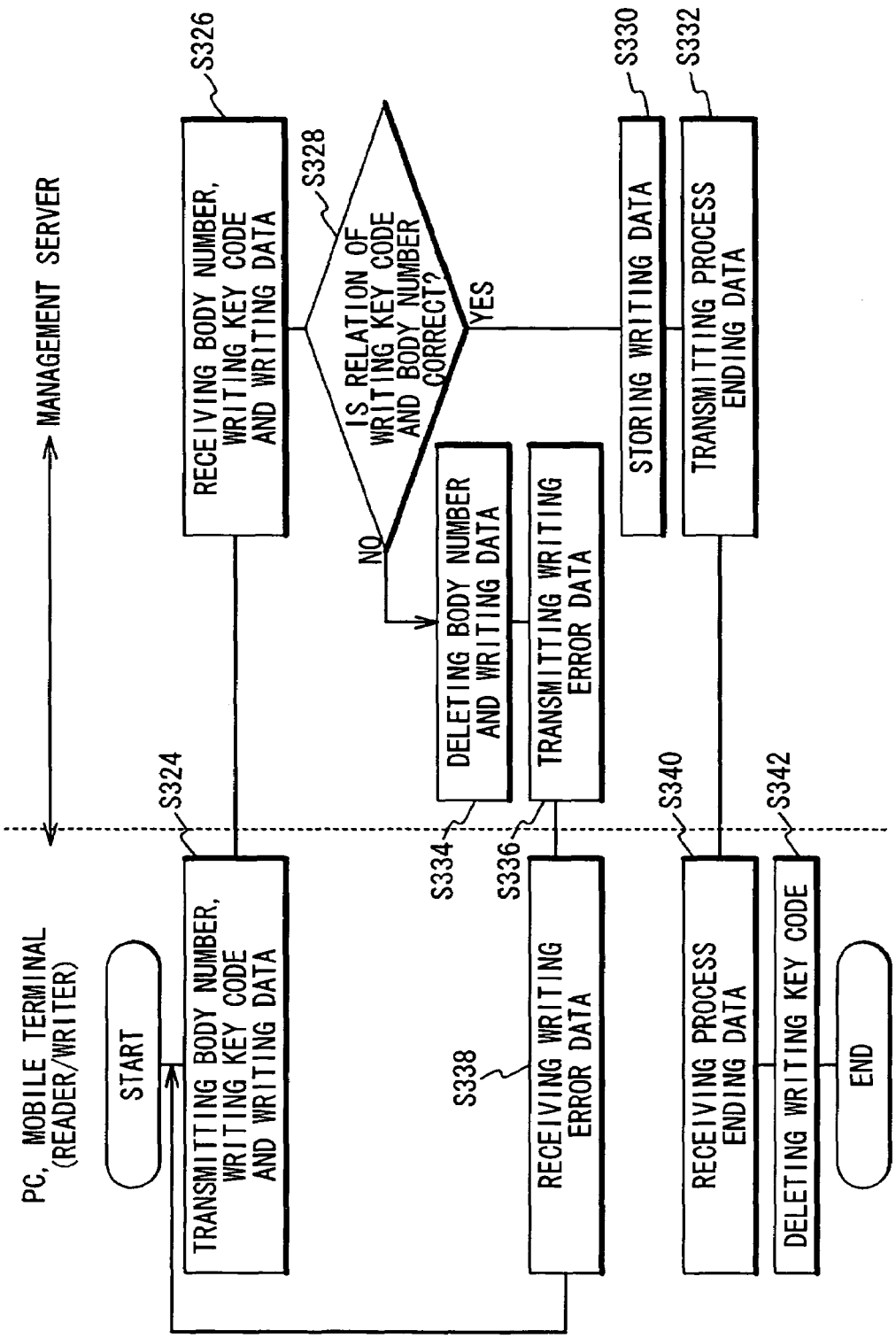

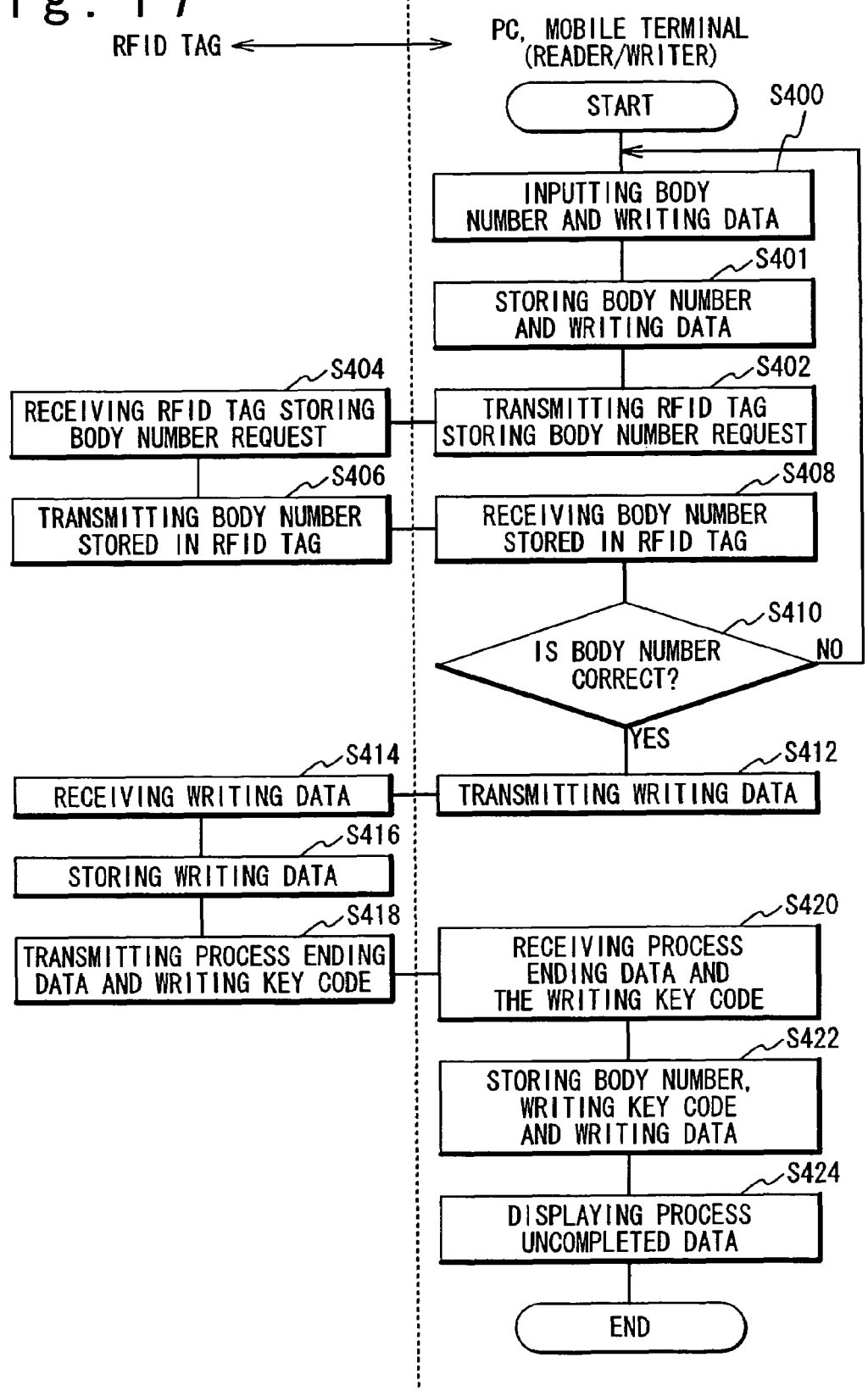

PRODUCT LIFECYCLE DATA MANAGEMENT SYSTEM AND PRODUCT LIFECYCLE DATA MANAGEMENT METHOD

BACKGROUND OF THE INVENTION

1. Field of the Invention

The present invention relates to a product lifecycle data management system and a product lifecycle data management method. More particularly, the present invention relates to a product lifecycle data management system which can manage data for each cycle of a product lifecycle of products distributed in a market, and a product lifecycle data management method of using the same.

2. Description of the Related Art

A modern distribution system is based on mass production and mass consumption. In this system, a product produced in a factory has a product lifecycle. That is, firstly, the product is produced in a production part of the product lifecycle. Then, the product is shipped from the production part to a distribution part of the product lifecycle, such as a warehouse. Next, the product is placed on the market in a sales and service part of the product lifecycle. Then, the sold product is collected as a used product, and is eventually discarded to be recycled in discarding and recycling part of the product lifecycle. Each of the product lifecycle parts (mainly, the production part, the distribution part, the sales and service part, and the discarding and recycling part) comes to be varied corresponding to widening and enlarging of the distribution market of the products and varying products.

Especially, it is becoming a mainstream practice for the manufacturers to have to be responsible for the products in the last phase of the product lifecycle, in view of the rising needs of the distribution market in terms of caring for environment issues, even with respect to the section where used products are finally reached after collecting, discarding and recycling. Therefore, it is essentially important for the manufacturers supplying the products to the market to manage data of the products in each part of the product lifecycle.

As an example of a method for managing the product lifecycle, a technique for managing the product lifecycle by using a Radio Frequency Identification (hereinafter referred to as RFID) tag attached to a product is disclosed in the Japanese Laid Open Patent Application (JP2000-48066). In this technique, the RFID tag, which includes memory for storage of data related to a product, is attached to the product. Then, by reading out the data from the RFID tag, a state of the product is ascertained. In this technique, a lifecycle database used to manage the product lifecycle is provided at each distribution hub. Data more detailed than that stored in the RFID tag is stored in the database.

The data stored in the database are related to the data stored in the RFID tag to be organized in order to manage the data. Each of the databases is provided to a corresponding one of a production control system of a manufacture, marketing management systems of distributors, marketing management systems of retailers, service management systems of companies dealing with maintenance and services, and management systems of the discarding/recycling companies. These plural databases are connected each other by a network so as to permit access to each data. In this conventional method for managing the product lifecycle, these companies collaborate with each other with respect to the data regarding the products.

The product data in the database provided in each system hub are managed only by a product ID. An information terminal connected with the network can access the database at any place in the network by using the product ID. In this way, the data in the database provided in each system hub can be effectively utilized without any geographic or time constraints A person who knows the product ID to access the database can freely access the data of the product stored in the database. In order to utilize the data in the database more effectively in each system hub, it is necessary to improve security level such as an access restriction wherein only the person who registers his/her personal data can access the database. In a system where a great deal of products have to be processed at short time, such as a repair system hub and the like, it is necessary for a person in charge in the system to carefully prevent a failure, that is, a mismatch between data stored in an RFID tag and the data in a database when the data in the RFID tag is rewritten and quickly notified to the database.

A system with high reliability is desired, that is accessible to the database from any place in the network by using product ID and in which the mismatch between data stored in the RFID tag and the data in the database does not occur.

SUMMARY OF THE INVENTION

Therefore, an object of the present invention is to provide a product lifecycle data management system and a product lifecycle data management method that is accessible to the database from any place in the network by using product ID.

Another object of the present invention is to provide a product lifecycle data management system and a product lifecycle data management method which has high reliability, in which the mismatch between data stored in the RFID tag and the data in the database does not occur.

This and other objects, features and advantages of the present invention will be readily ascertained by referring to the following description and drawings.

In order to achieve an aspect of the present invention, the present invention provides a product lifecycle data management system including: a data processing terminal; a memory medium; and a management server. The data processing terminal includes: a first input unit, a first memory unit, a first communication unit, a first display unit and a first data processing unit. The first input unit inputs a first identifier of a product and a product related data of the product. The first memory unit stores the first identifier and the product related data. The first communication unit transmits the first identifier and the product related data to the memory medium. The first display unit displays a first process ending data received from the memory medium. The first process ending data indicates an end of data processing in the memory medium. The first data processing unit transmits the first identifier. The product related data and a first key data are received from the memory medium to the management server. The first display unit displays a second process ending data received from the management server, wherein the second process ending data indicates an end of data processing in the management server. The memory medium includes: a second memory unit, a second data processing unit and a second communication unit. The second memory unit compares the first identifier received from the data processing terminal with a second identifier of the product, and stores the product related data received from the data processing terminal when the first identifier is the same as the second identifier. The second identifier is previously stored in the second memory unit. The second data processing unit generates the first process ending data. The second communication unit transmits the first process ending data and the first key data corresponding to the previously stored second identifier in the second memory unit. The management server includes: a third memory unit and a third data processing unit. The third memory unit compares a first set comprising the first identifier and the first key data received from the data processing terminal, with a plurality of second sets comprising a third identifier and a second key data corresponding to the third identifier for a plurality of products. The third memory unit stores the product related data when the one of the second sets is the same as the first set. The plurality of second sets is previously stored in the third memory unit. The third data processing unit generates and transmits the second process ending data to the data processing terminal.

In the product lifecycle data management system, the first display unit displays a process uncompleted data from the time when displaying the first process ending data received from the memory medium to the time when transmitting the first identifier. The product related data and the first key data are transmitted to the management server.

In the product lifecycle data management system, the first key data is set for each of data items of a data table stored in the first memory medium.

In the product lifecycle data management system, the memory medium may be an RFID tag including an integrated circuit (IC) chip and an antenna.

In order to achieve an aspect of the present invention, the present invention provides a product lifecycle data management system including: a data processing terminal, a memory medium and a management server. The data processing terminal includes: a first input unit, a first memory unit, a first data processing unit, a first communication unit and a first display unit. The first input unit inputs a first identifier of a product and a product related data of the product. The first memory unit stores the first identifier and the product related data. The first data processing unit generates a transmission request indicating a request for transmitting a second identifier stored in the memory medium. The first communication unit transmits the transmission request to the memory medium. The first display unit displays a first process ending data received from the memory medium, wherein the first process ending data indicates an end of data processing in the memory medium. The first data processing unit compares the first identifier with the second identifier received from the memory medium. The first communication unit transmits the product related data to the memory medium when the first identifier is the same as the second identifier. The first data processing unit transmits the first identifier, the product related data and a first key data received from the memory medium to the management server. The first display unit displays a second process ending data received from the management server. The second process ending data indicates an end of data processing in the management server. The memory medium includes: a second communication unit, a second memory unit, and a second data processing unit. The second communication unit transmits the second identifier to the data processing terminal in response to the transmission request. The second memory unit stores the product related data received from the data processing terminal. The second data processing unit generates the first process ending data. The second communication unit transmits the first process ending data and the first key data corresponding to the previously stored second identifier. The management server includes: a third memory unit and a third data processing unit. The third memory unit compares a first set of the first identifier and the first key data received from the data processing terminal with a plurality of second sets of a third identifier and a second key data corresponding to the third identifier for a plurality of products, and stores the product related data when the one of the second sets is the same as the first set, the plurality of second sets is previously stored in the third memory unit. The third data processing unit generates and transmits the second process ending data to the data processing terminal.

In the product lifecycle data management system, the first display unit displays a process uncompleted data from the time when displaying the first process ending data received from the memory medium to the time when transmitting the first identifier. The product related data and the first key data are transmitted to the management server.

In the product lifecycle data management system, the first key data is set for each of data items of a data table stored in the first memory medium.

In the product lifecycle data management system, the memory medium may be an RFID tag including an IC chip and an antenna.

In order to achieve another aspect of the present invention, the present invention provides a product lifecycle data management method including the steps of: (a) receiving a first identifier of a product and a product related data of the product from a data processing terminal; (b) storing the first identifier and the product related data from the data processing terminal; (c) transmitting the first identifier and the product related data to a memory medium by the data processing terminal; (d) comparing the first identifier with a second identifier previously stored in the memory medium by the memory medium; (e) storing the product related data when the first identifier is the same as the second identifier by the memory medium; (f) transmitting a first process ending data and a first key data corresponding to the second identifier previously stored in the memory medium by the memory medium, wherein the first process ending data indicates an end of data processing in the memory medium; (g) displaying the first process ending data on a first display unit by the data processing terminal; (h) transmitting the first identifier, the product related data and the first key data to a management server by the data processing terminal; (i) comparing a first set of the first identifier and the first key data with a plurality of second sets of a third identifier and a second key data corresponding to the third identifier for a plurality of products by the management server, wherein the plurality of second sets is previously stored in the management server; (j) storing the product related data when one of the second sets is the same as the first set by the management server; (k) transmitting a second process ending data to the data processing terminal by the management server, wherein the second process ending data indicates an end of data processing in the management server; and (l) displaying the second process ending data on the first display unit by the data processing terminal.

In the product lifecycle data management method, the (h) step includes (h1) displaying a process uncompleted data on the first display unit by the data processing terminal until transmitting the first identifier, the product related data and the first key data to the management server. The process uncompleted data indicates that the transmitting of the data to the management server is uncompleted.

In order to achieve another aspect of the present invention, the present invention provides a product lifecycle data management method including the steps of: (a) receiving a first identifier of a product and a product related data of the product by a data processing terminal; (b) storing the first identifier and the product related data by the data processing terminal; (c) transmitting a transmission request to a memory medium by the data processing terminal, wherein the transmission request indicates a request for transmitting a second identifier stored in the memory medium; (d) transmitting the second identifier previously stored to the data processing terminal in response to the transmission request by the memory medium; (e) comparing the first identifier with the second identifier by the data processing terminal; (f) transmitting the product related data to the memory medium when the first identifier is the same as the second identifier by the data processing terminal; (g) storing the product related data by the memory medium; (h) transmitting a first process ending data and a first key data corresponding to the second identifier previously stored by the memory medium, wherein the first process ending data indicates an end of data processing in the memory medium; (i) displaying the first process ending data on a first display unit by the data processing terminal; (j) transmitting the first identifier, the product related data and the first key data to the management server by the data processing terminal; (k) comparing a first set of the first identifier and the first key data with a plurality of second sets of a third identifier and a second key data corresponding to the third identifier for a plurality of products by the management server, wherein the plurality of second sets is previously stored in the memory medium; (l) storing the product related data when the one of the second sets is the same as the first set by the management server; (m) transmitting a second process ending data to the data processing terminal by the management server, wherein the second process ending data indicates an end of data processing in the management server; and (n) displaying the second process ending data on the first display unit by the data processing terminal.

In the product lifecycle data management method, the (j) step includes (j1) displaying a process uncompleted data on the first display unit by the data processing terminal until transmitting the first identifier, the product related data and the first key data to the management server, the process uncompleted data indicates that the transmitting of the data to the management server is uncompleted.

In order to achieve still another aspect of the present invention, the present invention provides a computer program product embodied on a computer-readable medium and including code that, when executed, causes a computer to perform the following: (a) receiving a first identifier of a product and a product related data of the product by a data processing terminal; (b) storing the first identifier and the product related data by the data processing terminal; (c) transmitting the first identifier and the product related data to a memory medium by the data processing terminal; (d) receiving a first process ending data and a first key data corresponding to a second identifier from the memory medium by the data processing terminal, after the product related data is stored in the memory medium in case that the first identifier is the same as the second identifier, wherein the second identifier is stored in the memory medium, the first process ending data indicates an end of data processing in the memory medium; (e) displaying the first process ending data on a first display unit by the data processing terminal; (f) transmitting the first identifier, the product related data and the first key data to a management server by the data processing terminal; (g) receiving a second process ending data from the management server by the data processing terminal, after the product related data is stored in the management server in case that a first set of the first identifier and the first key data is the same as one of a plurality of second sets of a third identifier and a second key data corresponding to the third identifier for a plurality of products, wherein the plurality of second sets is previously stored in the management server, and the second process ending data indicates an end of data processing in the management server; and (h) displaying the second process ending data on the first display unit by the data processing terminal.

In the computer program product, the (f) step includes (f1) displaying a process uncompleted data on the first display unit by the data processing terminal until transmitting the first identifier, the product related data and the first key data to the management server, the process uncompleted data indicates that the transmitting of the data to the management server is uncompleted.

In order to achieve still another aspect of the present invention, the present invention provides a computer program product embodied on a computer-readable medium and including code that, when executed, causes a computer to perform the following: (a) receiving a first identifier of a product and a product related data of the product by a data processing terminal; (b) storing the first identifier and the product related data by the data processing terminal; (c) transmitting a transmission request to a memory medium by the data processing terminal, wherein the transmission request indicates a request for transmitting a second identifier stored in the memory medium; (d) receiving the second identifier previously stored in the memory medium from the memory medium by the data processing terminal; (e) comparing the first identifier with the second identifier by the data processing terminal; (f) transmitting the product related data to the memory medium when the first identifier is the same as the second identifier by the data processing terminal; (g) receiving a first process ending data and a first key data corresponding to the second identifier from the memory medium by the data processing terminal, after the memory medium stores the product related data, wherein the first key data is previously stored in the memory medium, and the first process ending data indicates an end of data processing in the memory medium; (h) displaying the first process ending data on a first display unit by the data processing terminal; (i) transmitting the first identifier, the product related data and the first key data to the management server by the data processing terminal; (j) receiving a second process ending data from the management server by the data processing terminal, after the product related data is stored in the management server in case that a first set of the first identifier and the first key data is the same as one of a plurality of second sets of a third identifier and a second key data corresponding to the third identifier for a plurality of products, wherein the plurality of second sets is previously stored in the management server, the second process ending data indicates an end of data processing in the management server; and (k) displaying the second process ending data on a first display unit by the data processing terminal.

In the computer program product, the (i) step includes (i1) displaying a process uncompleted data on the first display unit by the data processing terminal until transmitting the first identifier, the product related data and the first key data to the management server, the process uncompleted data indicates that the transmitting of the data to the management server is uncompleted.

BRIEF DESCRIPTION OF THE DRAWINGS

FIG. 7 is an RFID tag storage data table showing the type and configuration of data to be stored in the RFID tag 1 of the embodiment of the present invention;

FIG. 8 is a manufacturing management database storage data table 60 showing the type and configuration of data stored in a manufacturing management database of the embodiment of the present invention;

FIG. 9 is a distribution management database storage data table 70 showing the type and configuration of data stored in a distribution management database of the embodiment of the present invention;

FIG. 10 is a sale and service management database storage data table 80 showing the type and configuration of data stored in a sale and service management database of the embodiment of the present invention;

FIG. 11 is a discarding and recycling management database storage data table 90 showing the type and configuration of data stored in a discarding and recycling management database of the embodiment of the present invention;

FIG. 16 is a flowchart showing another operation of the embodiment of the present invention showing communication between the terminal and management server in the case that data are rewritten in the management servers in a predetermined time after data is written to the RFID tag under intermittent communication conditions; and FIG. 17 is a flowchart showing another operation of the embodiment of the present invention, showing the communication between the terminals and an RFID tag in the case that data are rewritten in the management servers in a predetermined time after data is written to the RFID tag, for the case in which the RFID tag does not include a determinable CPU.

DESCRIPTION OF THE PRESENT EMBODIMENTS

Embodiments of a product lifecycle data management system and a product lifecycle data management method according to the present invention will be described below with reference to the attached drawings.

Figure 1:
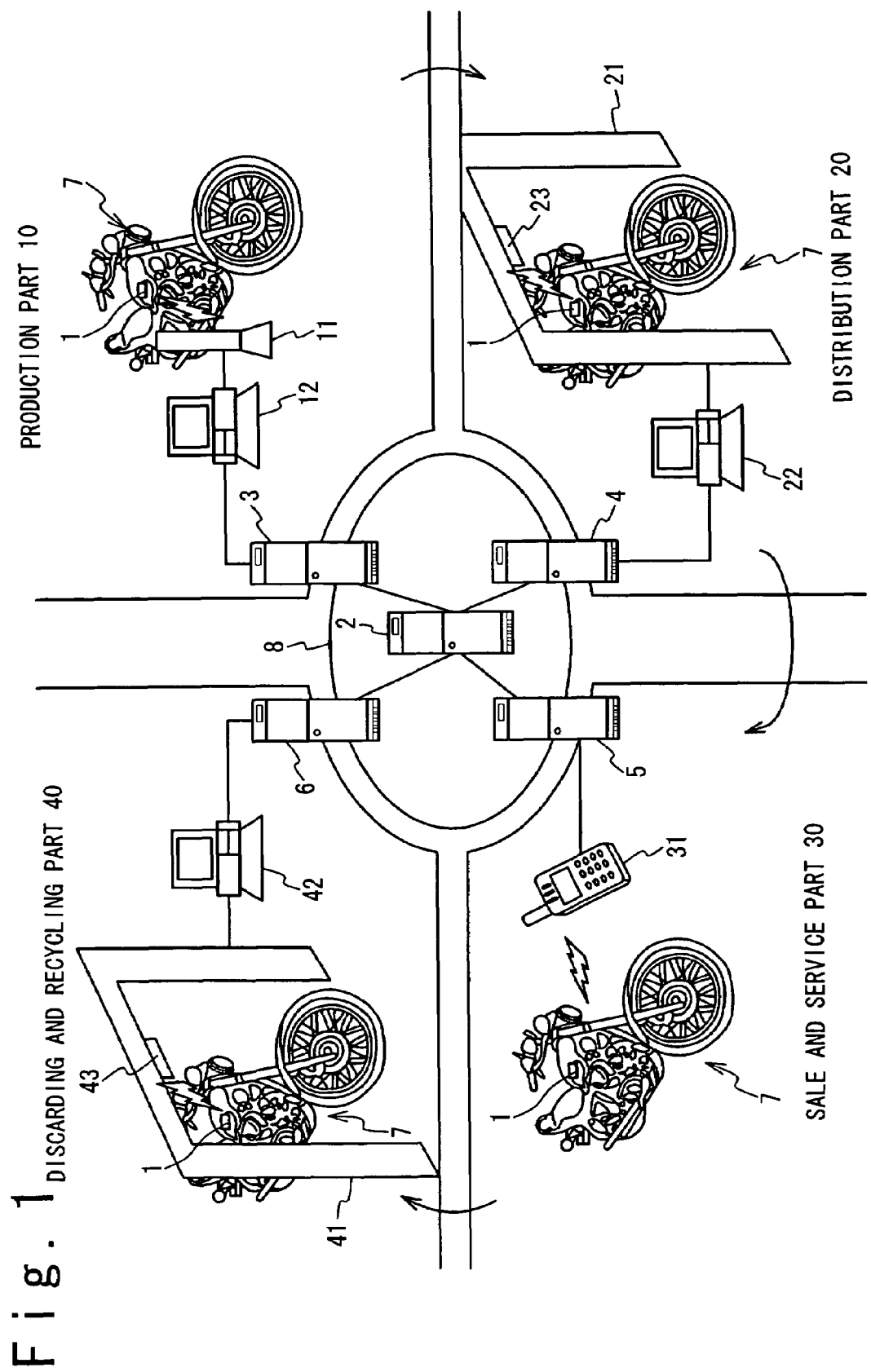
FIG. 1 is a schematic diagram showing an embodiment of the product lifecycle data management system of the present invention.

FIG. 1 is a schematic diagram showing the embodiment of the product lifecycle data management system of the present invention. A product produced in a factory has a product lifecycle. That is, firstly, the product is shipped from a production part to a distribution part such as a warehouse. Then, the product is placed on the market in a sales and service part. Then, the sold product is collected as a used product, and is discarded to be recycled in a discarding and recycling part. Each of the product lifecycles comes to be varied corresponding to widening and enlargement of the distribution in the market of the products. In this embodiment, it is supposed that one product lifecycle is divided into four parts, which are a production part 10, a distribution part 20, a sale and service part 30, a discarding and recycling part 40. The product is managed in each part of its product lifecycle.

The production part 10 is a part for a manufacturer. The management system in the production part 10 manages the production of the products 7, the shipping of the completed products 7 and the like.

The distribution part 20 is a part for a distribution trader. A management system in the distribution part 20 manages the transportation and storage of the products 7 shipped from the production part 10.

The sale and service part 30 is a part for a retailer and service provider. A management system in the sale and service part 30 manages sales, maintenance and repairing of the products 7 shipped from the production part 10 via the distribution part 20. In FIG. 1, the sale and the service are shown in a single part as the sale and service part 30. However, it should be noted that it does not means that the sale and the service are always in the same part in the product lifecycle management system of the present invention.

The discarding and recycling part 40 is a part for a discarding and recycling trader. The products 7 are recycled or discarded when they have lost their value as products, after being sold at the sale and service part 30. A management system in the discarding and recycling part 40 manages the recycle state of the products 7, when the products 7 are recycled. Also, the management system in the discarding and recycling part 40 manages the discard state of the products 7, when the products are discarded.

The product 7 is produced in the production part 10. An RFID tag 1 is attached to the product 7 produced in the production part 10. A motorcycle exemplifies the products 7 in the following explanation. However, it should be noted that the product 7 is not necessarily limited to the motorcycle. The products 7 are exemplified in automobiles, power products, robots and aircraft engines. The RFID tag 1 is a memory medium which is possible to attach to any part of the product 7. It is possible to write data to a memory area on the RFID tag 1 while having no physical contact with the RFID tag, and the written data is stored in the memory area of the RFID tag 1. It is possible to set the memory area to store the data, and it is possible for the data to be changed arbitrarily. The memory area of the RFID tag 1 has a writable memory area and an un-writable (or read-only) memory area. Data stored in the un-writable memory area is kept until the product 7 is discarded. The data in the un-writable memory area cannot be changed, once the data are written. The RFID tag 1 is attached to each product 7 produced in the production part 10. The RFID tag 1 attached to the product 7 stores the product data of the product 7 in each part of the product lifecycle.

The product 7 is a product to which the RFID tag 1 can be attached. The product 7 is composed of a plurality of parts and at least one RFID tag 1. A product ID (product identification number) is given to each product 7 during the process of the production in the production part 10. At the same time, a writing key code is set corresponding to the product ID. The product ID is related to the writing key code in a one to one correspondence. A body number of the motorcycle, which is produced in the production part 10, is used as the product ID in this embodiment.

A writing key code management server 2 stores the writing key code. The product ID, which is given to the product 7 in the product part 10, and the writing key code, which is set corresponding to the product ID, are stored in the writing key code management server 2.

The production part 10 includes a plurality of production hubs. Each of the production hubs includes a communication device 11 and a data processing terminal 12. A production part management server 3 is to manage the production part 10, and is connected with a network 8. Data which are transmitted from the data processing terminal 12 are stored in a database which is included in the production part management server 3 or in the external memory device (not shown). The production part management server 3 is connected with servers in other parts (areas) through the network 8, and cooperates with them for managing the data of the product lifecycle.

The communication device 11 is a communication device with which it is possible to transmit and receive data with the RFID tag 1. Further, the communication device 11, which is provided in each production hub, reads the data written in the RFID tag 1 automatically or in response to a read signal (instruction). Then, it outputs the read data to the data processing terminal 12. Also, the communication device 11 receives the data outputted from the data processing terminal 12, and transmits the received data to the RFID tag 1 automatically or in response to the read signal.

The data processing terminal 12 can communicate with the RFID tag 1 and is provided in each production hub. Further, the data processing terminal 12 transmits the data to be written in the RFID tag 1 to the RFID tag 1 through the communication device 11. Also, the data processing terminal 12 receives the writing data outputted from the communication device 11. Moreover, the data processing terminal 12 includes a data producing function (not shown) which produces the writing data to be written in the RFID tag 1.

In the production part 10, the RFID tag 1 is attached to product 7 at a specific process of the production. The RFID tag 1 attached to the product 7 stores the body number of the product 7 and the writing key code which corresponds to the body number.

The product 7 produced in the production part 10 is shipped from the production part 10 to the distribution part 20. The distribution part 20 includes a plurality of distribution hubs. Each hub includes a distribution gate 21, a data processing terminal 22 and a communication antenna 23. A distribution part management server 4 manages the distribution part 20 and is connected with the network 8. A data which is transmitted from the data processing terminal 22 is stored in a database which is included in the distribution part management server 4 or in the external memory device (not shown). Also, the distribution part management server 4 is connected with other servers in the other parts (areas) through the network 8, and cooperates with them for managing the data of the product lifecycle, as does the production part management server 3 of the production part 10.

The distribution gate 21 is a gate to let the products 7 through when the products 7 are shipped and loaded in each distribution hub. The distribution gate 21 is provided at the entrance and exit or the like of each distribution hub. The distribution gate 21 includes a communication antenna 23 by which it is possible to communicate with the RFID tag 1 attached to the product 7. The communication antenna 23 can communicate with each RFID tag 1 of a great number of the products 7, which are gathered at each distribution hub, when the products 7 pass through the distribution gate 21. Also, the distribution gate 21 includes a transmitting unit (not shown) and a receiving unit (not shown). The transmitting unit transmits the data read from the RFID tag 1 by the communication antenna 23 to the data processing terminal 22. The receiving unit receives the data transmitted from the data processing terminal 22 and outputs it to the communication antenna 23.

The data processing terminal 22 can communicate with the RFID tag 1 and connects with the distribution gate 21 by a wireless or wire communication to transmit data to be written in the RFID tag 1 to the RFID tag 1 through the communication antenna 23. Further, the data processing terminal 22 includes a data producing function (not shown) which produces the writing data to be written in the RFID tag 1.

The communication antenna 23 can transmit and receive the data with the RFID tag 1 and is provided in the distribution gate 21 installed in each distribution hub. The communication antenna 23 reads the data of the RFID tag 1 automatically or in response to the read signal (instruction). Then, the communication antenna 23 outputs the written data to the data processing terminal 22. Also, the communication antenna 23 transmits the received data outputted from the data processing terminal 22 to the RFID tag 1 through the receiving unit of the distribution gate 21 automatically or in response to the write signal.

The product 7 from the distribution part 20 is sent to the sale and service part 30. The sale and service part 30 includes a plurality of sale and service hubs and the each hub includes a sale and service part management server 5 and a mobile terminal 31.

The sale and service part management server 5 is to manage sale and service part 30 and is connected with the network 8. Data which is transmitted from the mobile terminal 31 is stored in a database which is included in the sale and service part management server 5 or in the external memory device (not shown). Also, the distribution part management server 5 is connected with other servers in the other parts (areas) through the network 8, and cooperates with them for managing the data of the product lifecycle, as does the production part management server 3 of the production part 10 and the distribution part management server 4 of the distribution part 20.

The portable mobile terminal 31 may be carried by a person. The mobile terminal 31 includes a communication unit (not shown) which can communicate with the sale and service part management server 5. The mobile terminal 31 further includes a reading function (not shown) to read a data stored in the RFID tag attached to the product 7, and also includes writing function (not shown) to write a new data in the RFID tag 1. Moreover, the mobile terminal 31 includes a data producing function (not shown) which produces the writing data to be written in the RFID tag 1.

The product 7, when it has become unnecessary to the user, is sent to the discarding and recycling part 40. The discarding and recycling part 40 includes a plurality of discarding and recycling hubs. Each hub includes a discarding and recycling part management server 6, a discarding and recycling gate 41, a data processing terminal 42 and a communication antenna 43.

The discarding and recycling part management server 6 manages the discarding and recycling part 40 and is connected with the network 8. A data which is transmitted from the a data processing terminal 42 is stored in a database which is included in the discarding and recycling part management server 6 or in the external memory device (not shown). Also, the discarding and recycling part management server 6 is connected with other servers in the other parts (areas) through the network 8, and cooperates with them for managing the data of the product lifecycle, as the production part management server 3 of the production part 10 and the distribution part management server 4 of the distribution part 20.

The discarding and recycling gate 41 is a gate to let discarded products 7 through when the discarded products 7 are carried in and carried out to each discarding and recycling hub. The discarding and recycling gate 41 is provided at the entrance and exit or the like in each discarding and recycling hub. The discarding and recycling gate 41 includes a communication antenna 43 by which it is possible to communicate with the RFID tag 1 attached to the product 7. The communication antenna 43 can communicate with each RFID tag 1 of a great number of the products 7, which are gathered at each discarding and recycling hub, when the disused products 7 pass through the discarding and recycling gate 41. Also, the discarding and recycling gate 41 includes a transmitting unit (not shown) and a receiving unit (not shown). The transmitting unit transmits the data read from the RFID tag 1 by the communication antenna 43 to the data processing terminal 42. The receiving unit receives the data transmitted from the data processing terminal 42 and outputs it to the communication antenna 43.

The data processing terminal 42 can communicate with the RFID tag 1 and connects with the discarding and recycling gate 41 by a wireless or wire communication to transmit data to be written in the RFID tag 1 to the RFID tag 1 through the communication antenna 43. Further, the data processing terminal 42 includes a data producing function (not shown) which produces the writing data to be written in the RFID tag 1.

The communication antenna 43 can transmit and receive the data with the RFID tag 1 and is provided in the discarding and recycling gate 41 installed in each discarding and recycling hub. The communication antenna 43 reads the data of the RFID tag 1 automatically or in response to the read signal (instruction), then outputs the written data to the data processing terminal 42. Also, the communication antenna 43 transmits the received data outputted from the data processing terminal 42 through the receiving unit of the discarding and recycling gate 41 automatically or in response to the write signal (instruction).

FIGS. 2 to 6 are a block diagram showing a configuration of the product lifecycle data management system of the embodiment of the present invention.

Referring to FIGS. 2 to 6, the product lifecycle data management system in the embodiment of the present invention includes the four parts of the product lifecycle, which are the production part 10, the distribution part 20, the sale and service part 30 and the discarding and recycling part 40. The product lifecycle data management system is composed of management servers (3-6) provided in each part (10-40), and a writing key code management server 2 which connects with each management server.

Figure 2:
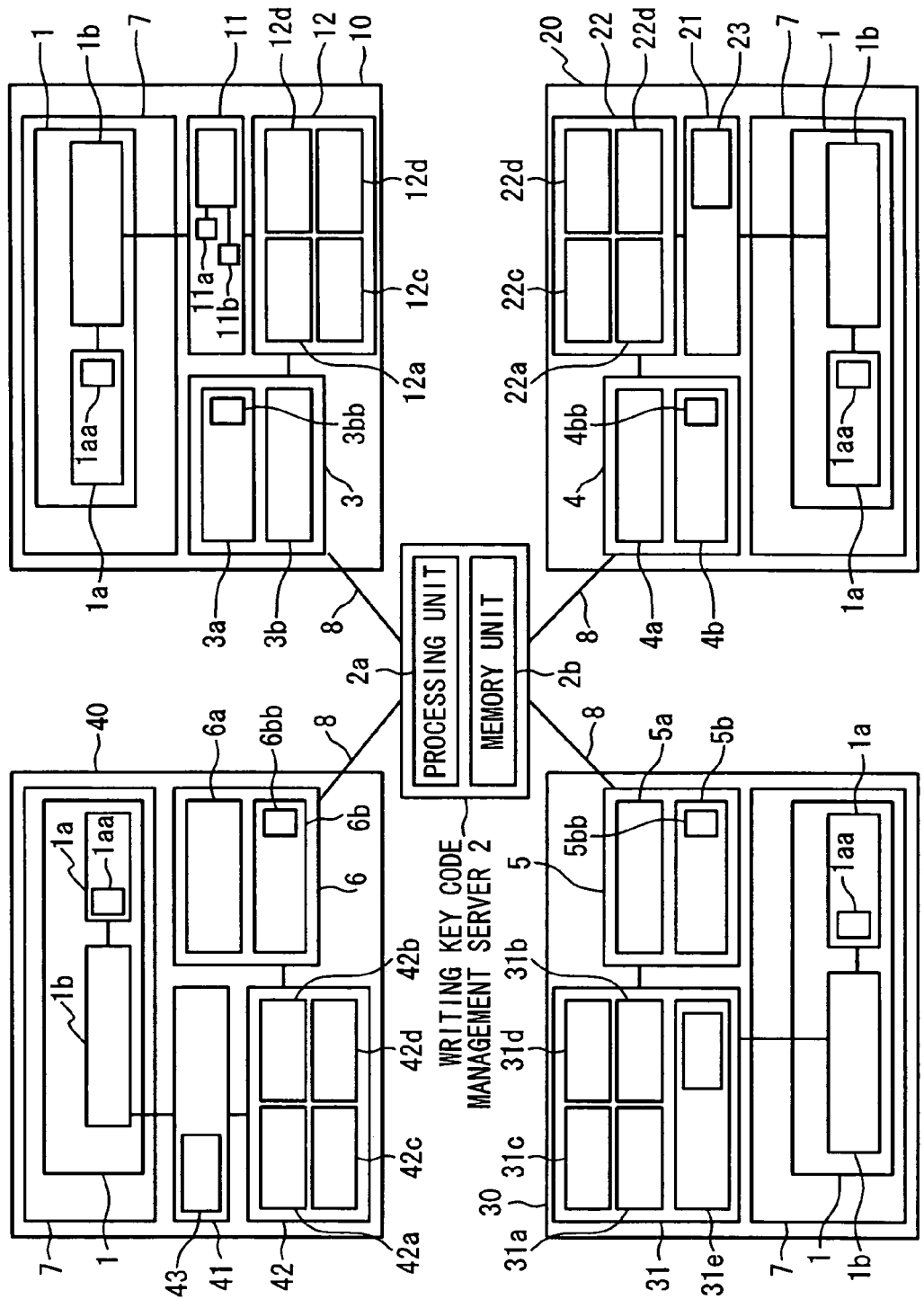
FIG. 2 is a block diagram showing an overall configuration of the product lifecycle data management system of the embodiment of the present invention, including the writing key code management server.

In FIG. 2, the writing key code management server 2 includes a processing unit 2a and a memory unit 2b. The processing unit 2a is a data processing functional block, which includes a CPU (Central processing Unit) to process data transmitted from the management servers provided in each product lifecycle part. The memory unit 2b is a data memory functional block, which includes data memory function such as a magnetic memory medium, a semiconductor memory and the like to store the writing key code transmitted from the production part 10.

Figure 3:
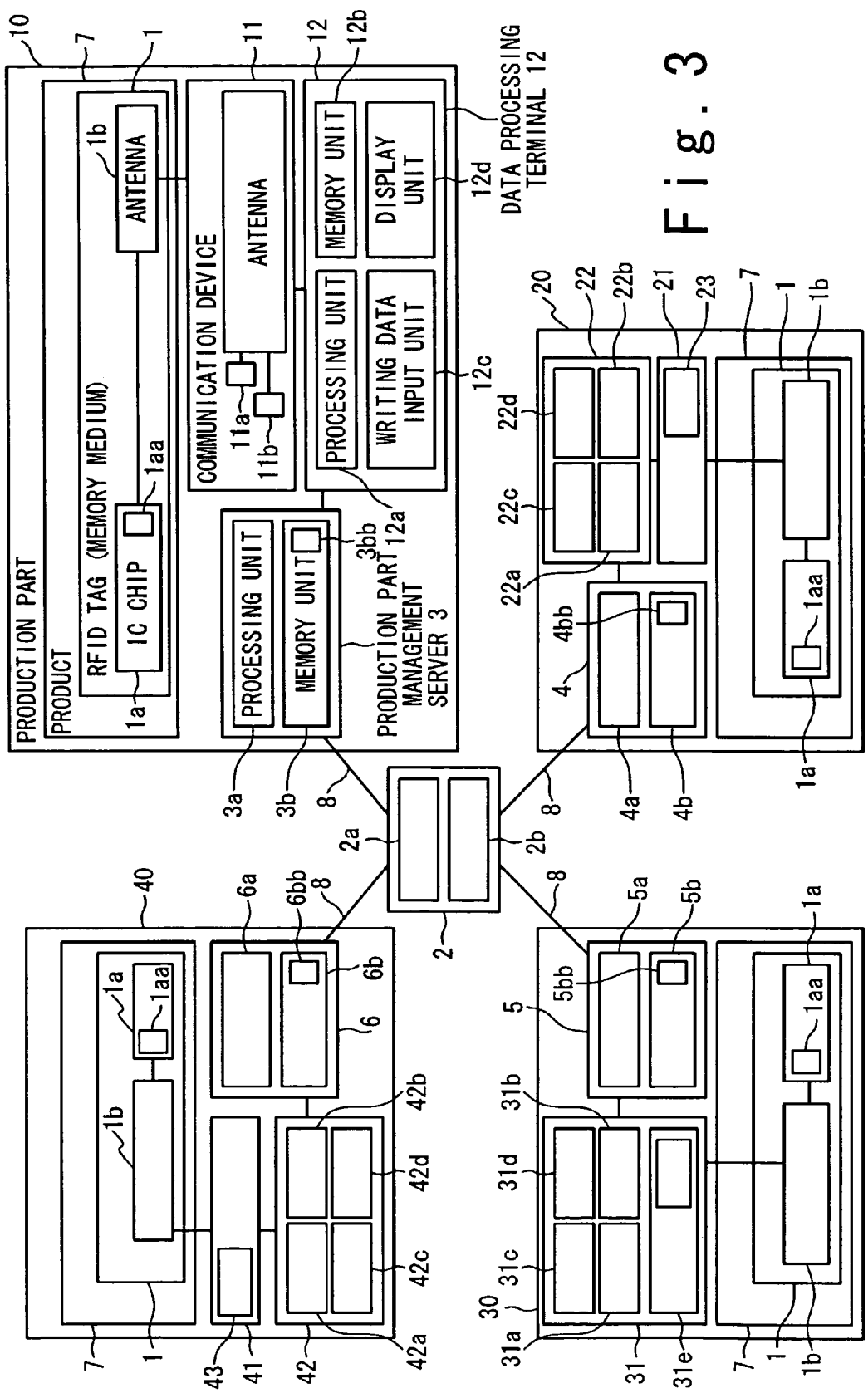
FIG. 3 is a block diagram showing a configuration of the production part of the product lifecycle data management system of the embodiment of the present invention.

In FIG. 3 is a schematic diagram of the production part 10 of the product lifecycle data management system, which includes the production part management server 3, the data processing terminal 12 and the communication device 11. The production part management server 3 is connected with the writing key code management server 2 and the data processing terminal 12. The production part management server 3 further includes a processing unit 3a and a memory unit 3b.

The processing unit 3a is a data processing functional block, which includes a CPU to process data in response to the data inputted from the data processing terminal 12. The processing unit 3a instructs the memory unit 3b to update the data in response to the data processing. The memory unit 3b updates a data stored in a production management database 3bb in response to the instruction from the processing unit 3a. The memory unit 3b is a data memory functional block, which includes data memory function such as a magnetic memory medium and the like, and includes the production management database 3bb. The memory unit 3b updates the data stored in the production management database 3bb in response to the instruction from the processing unit 3a.

The data processing terminal 12 is connected with the production part management server 3 and the communication device 11. The data processing terminal 12 further includes a writing data input unit 12c, a display unit 12d to display data, a processing unit 12a, and a memory unit 12b. The processing unit 12a is a data processing functional block, which includes a CPU to process data to write in the RFID tag 1 in response to the data inputted from the writing data input unit 12c. The memory unit 12b is a data memory functional block, which includes data memory function such as a magnetic memory medium and the like to store the writing data in the RFID tag 1. Also, the memory unit 12b sends the writing data to the production part management server 3 when updating the production part management server 3 through the network in the production part 10.

The communication device 11 includes a data communication unit 11a to communicate with the data processing terminal 12, and a radio communication unit 11b to communicate with the RFID tag 1. The parts constituting the product 7, which are dealt at each production hub of the production part 10 are various in their size. When the RFID tag 1 is attached to each part which constitutes the product 7, there may be a case that the gate with a large-sized radio communication unit can not be installed depending on the size of the parts. Even in this case, the management of the product lifecycle data can be executed properly by installing a suitable communication device 11 in each production hub.

At least one RFID tag 1 is attached to the product 7 which is produced and shipped from the production part 10. The RFID tag 1 attached to the product 7 further includes IC chips 1a and an antenna 1b. The IC chip 1a is built in the RFID tag 1 to store the data in a memory area 1aa. Reading and writing the data in the IC chip 1a can be carried out with a non-contact communication from outside. Also, the IC chip 1a outputs a predetermined data in response to an output instruction for the stored data. The antenna 1b is a communication antenna built in the RFID tag 1 to receive the radio wave from the communication device 11. The RFID tag 1 establishes a communication path and carries out data communication with the communication device 11 in response to a radio wave received by the antenna 1b.

Figure 4:
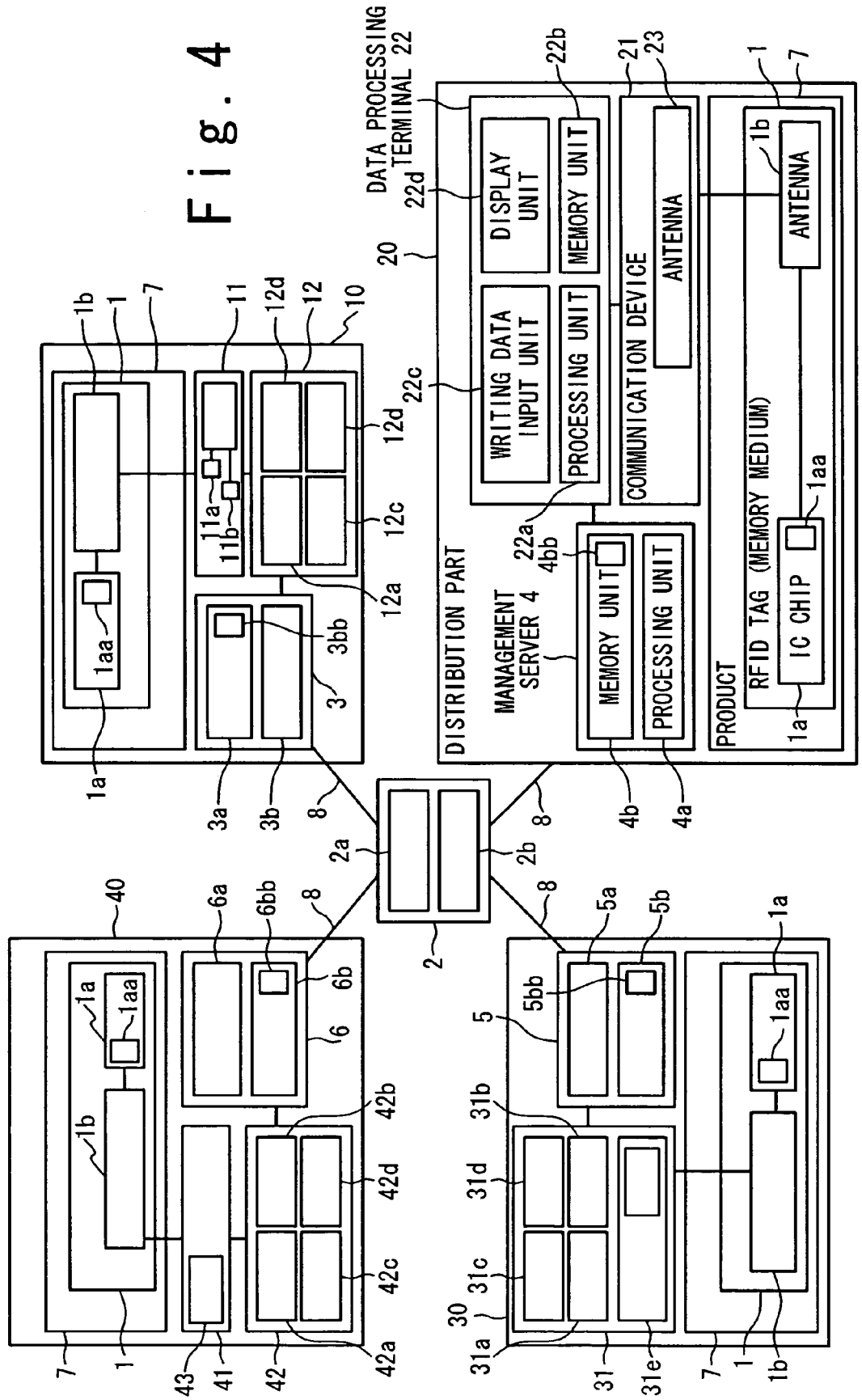
FIG. 4 is a block diagram showing a configuration of the distribution part of the product lifecycle data management system of the embodiment of the present invention.

FIG. 4 is a schematic diagram of the distribution part 20 of the product lifecycle data management system, which includes the distribution part management server 4, the distribution gate 21, the data processing terminal 22 and the communication antenna 23. The distribution part management server 4 is connected with a writing key code management server 2 and a data processing terminal 22. The distribution part management server 4 further includes a processing unit 4a and a memory unit 4b.

The processing unit 4a is a data processing functional block, which includes a CPU, and is the same as the processing unit 3a. The processing unit 4a processes data in response to the data transmitted from the data processing terminal 22. The processing unit 4a instructs the memory unit 4b to update the data in response to the data processing. The memory unit 4b updates the data stored in a distribution management database 4bb in response to the instruction from the processing unit 4a. The memory unit 4b is a data memory functional block, which includes data memory function such as a magnetic memory medium and the like, and includes the distribution management database 4bb. The memory unit 4b updates the data stored in the distribution management database 4bb in response to the instruction from the processing unit 4a.

The data processing terminal 22 is connected with the distribution part management server 4 and the distribution gate 21. The data processing terminal 22 further includes a writing data input unit 22c, a display unit 22d to display data, a processing unit 22a, and memory unit 22b. The processing unit 22a is a data processing functional block, which includes a CPU to process data to write in the RFID tag 1 in response to the data transmitted from the writing data input unit 22c. The memory unit 22b is a data memory functional block, which includes data memory function such as a magnetic memory medium and the like to store the writing data in the RFID tag 1. Also, the memory unit 22b sends the writing data to the production part management server 4 when updating the distribution part management server 4 through the network in the distribution part 20.

The RFID tag 1 attached to the produced and shipped product 7 communicates with the communication antenna 23 of the distribution gate 21 provided in each distribution hub in the distribution part 20. The writing data of the RFID tag 1 updated by the communication is notified to the distribution part management server 4. The product lifecycle data management system manages the product lifecycle data of the product 7 in response to the notified data.

Figure 5:
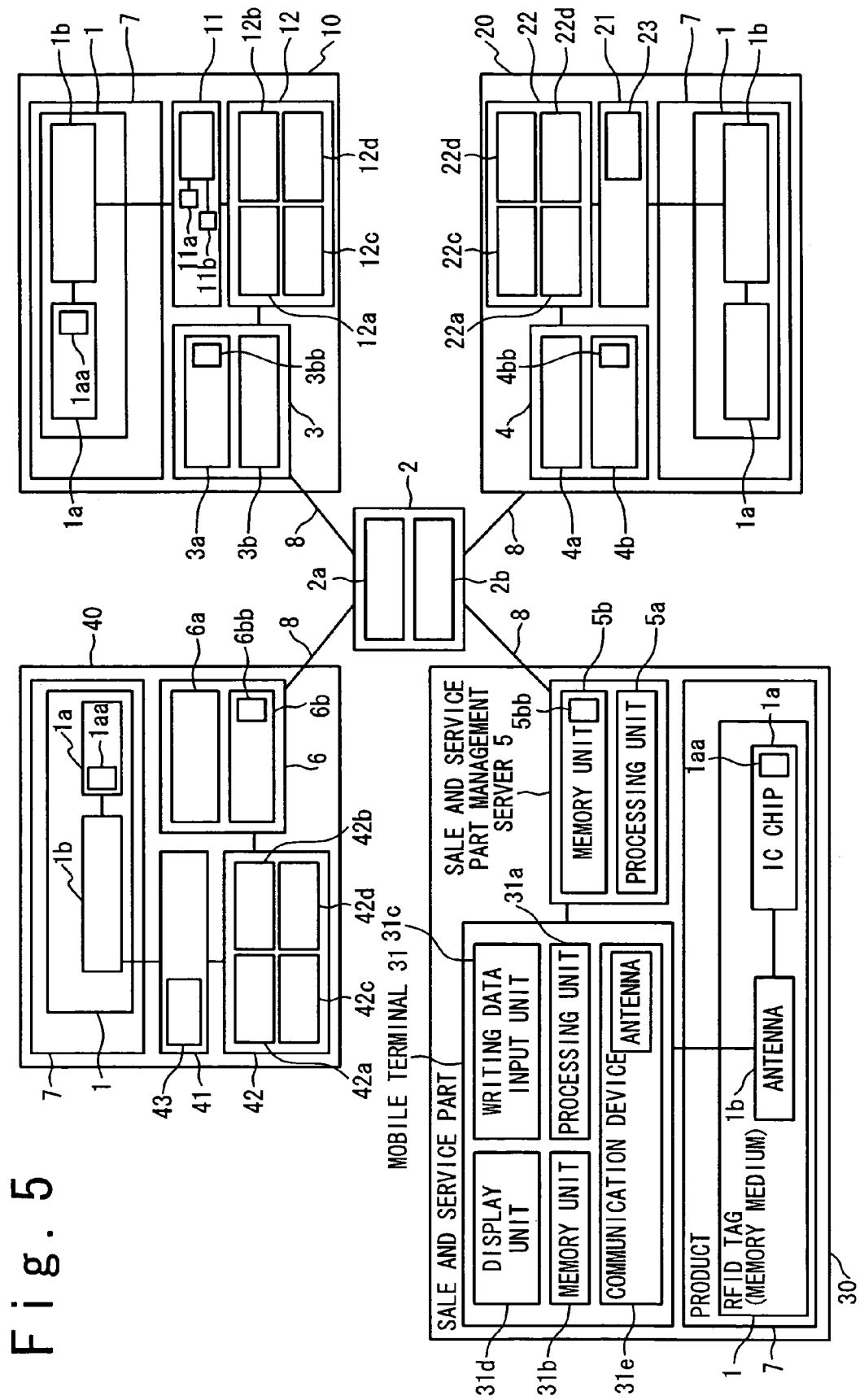
FIG. 5 is a block diagram showing a configuration of the sale and service part of the product lifecycle data management system of the embodiment of the present invention.

FIG. 5 is a schematic diagram of the sale and service part 30 of the product lifecycle data management system, which includes the sale and service part management server 5 and the mobile terminal 31. The sale and service part management server 5 is connected with the writing key code management server 2 and the mobile terminal 31. The sale and service part management server 5 further includes a processing unit 5a and a memory unit 5b. The processing unit 5a is a data processing functional block, which includes a CPU, and is the same as the processing unit 3a and the processing unit 4a. The processing unit 5a processes a data in response to the data transmitted from the mobile terminal 31. The processing unit 5a instructs the memory unit 5b to update data in response to the data processing. The memory unit 5b updates a data stored in a sale and service management database 5bb in response to the instruction from the processing unit 5a. The memory unit 5b is a data memory functional block, which includes data memory function such as a magnetic memory medium and the like, and includes the sale and service management database 5bb. The memory unit 5b updates the data stored in the sale and service management database 5bb in response to the instruction from the processing unit 5a.

The mobile terminal 31 includes a processing unit 31a, a memory unit 31b, a communication unit 31e, a writing data input unit 31c, and a display unit 31d to display data. The processing unit 31a is a data processing functional block, which includes a CPU to process data to write in the RFID tag 1 in response to the data transmitted from the writing data input unit 31c. The memory unit 31b is a data memory functional block, which includes data memory function such as a magnetic memory medium and the like to store the writing data in the RFID tag 1. Also, the memory unit 31b sends the writing data to the sale and service part management server 5 when updating the sale and service part management server 5 through the network in the sale and service part 30.

The communication unit 31e is communication functional block, which has functions for data communication with the RFID tag 1 and the sale and service part management server 5. At least one communication unit 31e is installed in the mobile terminal 31 and includes the functions for wireless communication with the RFID tag 1 and the sale and service part management server 5. The communication unit 31e, connected with the sale and service part management server 5, transmits the data processed by the processing unit 31a to the sale and service part management server 5, and receives the data outputted from the sale and service part management server 5. The communication unit 31e connected with the RFID tag 1 communicates with the IC chip 1a through the antenna 1b.

The writing data of the RFID tag 1 attached to the product 7 from the sale and service part 30 is updated by the communication with the mobile terminal 31 provided at each sale and service hub in the sale and service part 30. The writing data of the RFID tag 1 updated by the communication is sent to the sale and service part management server 5. The product lifecycle data management system manages the product lifecycle data of the product 7 in response to the notified data.

Figure 6:
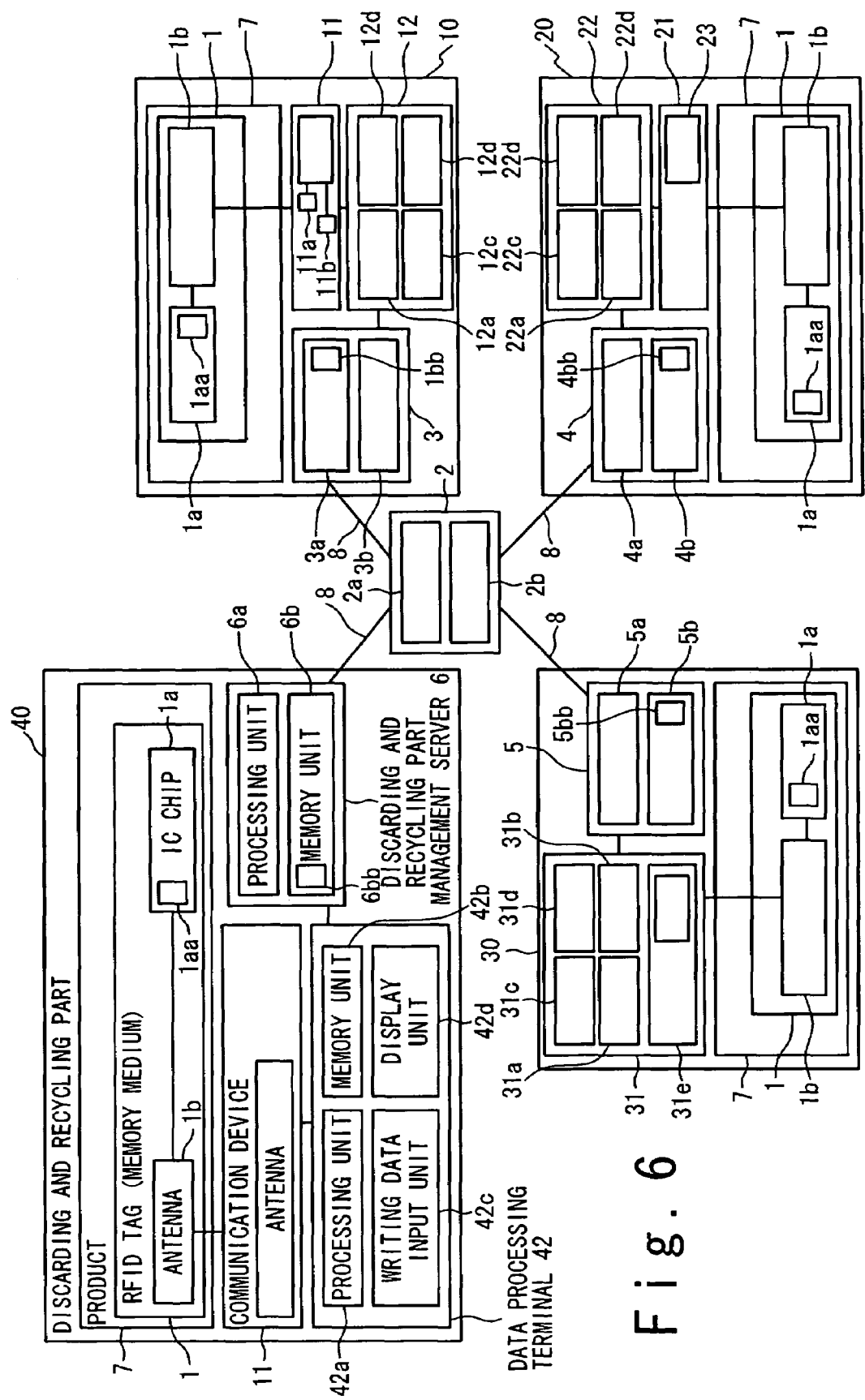
FIG. 6 is a block diagram showing a configuration of the discarding and recycling part of the product lifecycle data management system of the embodiment of the present invention.

FIG. 6 is a schematic diagram of the discarding and recycling part 40 of the product lifecycle data management system, which includes the discarding and recycling part management server 6, the discarding and recycling gate 41, the data processing terminal 42 and the communication antenna 43. The discarding and recycling part management server 6 is connected with the writing key code management server 2 and the data processing terminal 42, and further includes a processing unit 6a and a memory unit 6b.

The processing unit 6a is a data processing functional block, which includes a CPU to process data in response to the data transmitted from the data processing terminal 42, same as the processing unit 3a, the processing unit 4a, and the processing unit 5a. The processing unit 6a instructs the memory unit 6b to update the data in response to the data processing. The memory unit 6b updates the data stored in a discarding and recycling management database 6bb in response to the instruction from the processing unit 6a. The memory unit 6b is a data memory functional block, which includes data memory function such as a magnetic memory medium and the like, and includes the discarding and recycling management database 6bb. The memory unit 6b updates the data stored in the discarding and recycling management database 6bb in response to the instruction from the processing unit 6a.

The data processing terminal 42 includes a writing data input unit 42c, a display unit 42d to display data, a processing unit 42a, and memory unit 42b. The processing unit 42a is a data processing functional block, which includes a CPU to process data to write in the RFID tag 1 in response to the data transmitted from the writing data input unit 42c. The memory unit 42b is a data memory functional block, which includes data memory function such as a magnetic memory medium and the like to store the writing data in the RFID tag 1. Also, the memory unit 42b sends the writing data to the discarding and recycling management server 6 when updating the discarding and recycling management server 6 through the network in the discarding and recycling part 40.

The writing data of the RFID tag 1 attached to the product 7 sent to the discarding and recycling part 40 communicates with the communication antenna 43 of the gate 41 provided at each discarding and recycling hub in the discarding and the recycling part 40. The writing data of the RFID tag 1, updated by the communication, is sent to the discarding and recycling management server 6, then the product life cycle data management system manages the product lifecycle data of the product 7 in response to the notified data.

FIG. 7 is an RFID tag storage data table showing the data to be stored in the RFID tag 1 of the embodiment of the present invention. Referring to FIG. 7, the RFID tag storage data includes a body number 51, a writing key code 52, a production part data 53, a distribution part data 54, a sales and service part data 55 and a discarding and recycling part data 56. The body number 51 is a product identification of the product 7. The body number 51 is given to the product 7 produced in the production part 10 in a specific process. The RFID tag 1 stores a body number of the produced motorcycle as the body number 51, since the product lifecycle data management system of motorcycles is described in this embodiment.

The writing key code 52 is a key code to be used when the databases of the management servers in each lifecycle part are rewritten. The writing key code 52 works as a key to permit the rewrite of data in each database, and each database permits the rewriting of data in response to the authentication by the writing key code 52. Also, the writing key code 52 is set corresponding to the body number 51 in one to one correspondence at the same time when the body number 51 is given to the product 7. Generally, the writing key code 52 is encrypted and stored in RFID tag 1. Here, the writing key code 52 may be set in every data in the data table of the RFID tag 1, so that the access to the data in the database can be limited.

The body number 51 and the writing key code 52 are written in the un-rewritable (read only) part of the RFID tag 1. Also, the RFID tag 1 stores the data written in each part until the product 7 having the RFID tag 1 is discarded.

The production part data 53 is a data table showing data of the product 7 generated during production in the production part 10. The production part data 53 includes a product name/type data, a manufacture date data, a factory data, a repairing data and a shipping date data. The product name/type data indicates a product name and a product type of the product 7 having the RFID tag 1. The manufacture date data indicates the time of day the product 7 having the RFID tag 1 is manufactured. The factory data indicates the place (the factory) the product 7 having the RFID tag 1 is manufactured. The repairing data indicates data regarding the repair for the product 7 having the RFID tag 1 carried out in the factory. The shipping date data indicates the time of day of shipping the product 7 having the RFID tag 1 from the product part 10 after the completion of the producing.

The distribution part data 54 is a data table showing data of product 7 generated on a distribution channel in the distribution part 20. Further, the distribution part data 54 sequentially stores data in plural distribution hubs. For example, in a first distribution hub, the distribution part data 54 includes a transportation company data, a shipping route data, a shipping date data, and a loaded date data. The transportation company data indicates the transportation company which takes charge of a transportation of the product 7 having the RFID tag 1. The shipping route data indicates the channel route from the shipping to the loading of the product 7 having the RFID tag 1. The shipping date data indicates the time of day of shipping the product 7 having the RFID tag 1. The loaded date data indicates an arrival date of the product 7 via the channel route. The distribution part data 54 also stores data in other distribution hubs.

The sales and service part data 55 is a data table showing a data of product 7 on a sales channel in the sale and service part 30. Further, the sales and service part data 55 sequentially stores data in plural sales and service hubs. For example, in a first sales and service hub, the sales and service part data 55 includes a retailer data, a sales day data, a repair day data and a repairing data. The retailer data indicates the seller who sold the product 7 having the RFID tag 1. The sales day data indicates the time of day when the product 7 having the RFID tag 1 was sold. The repair day data indicates the time of day when the product 7 having the RFID tag 1 is to have maintenance, checked and repaired. The repairing data indicates contents of the maintenance, the checking and the repairing which are carried out to the product 7 having the RFID tag 1.

The discarding and recycling part data 56 is a data table showing data of product 7 which is sent to the discarding and recycling part 40. Further, the discarding and recycling part data 56 sequentially stores data in plural discarding and recycling hubs. For example, in a first discarding and recycling hub, the discarding and recycling part data 56 includes a collection trader data, a collection day data, a discarding trader data, a discarding day data. The collection trader data indicates the one in charge of the collection for discarding or recycling of the product 7 having the RFID tag 1. The collection day data indicates the time of day when the product 7 having the RFID tag 1 was collected. The discarding trader data indicates the one in charge of the discarding when the product 7 having the RFID tag 1 is determined to be disposal. The discarding day data indicates the time of day when the product 7 having the RFID tag 1 was discarded.

FIG. 8 is a manufacturing management database storage data table 60 showing data stored in a manufacturing management database of the embodiment of the present invention. The manufacturing management database is provided in the manufacturing management server. Referring to FIG. 8, the manufacturing management database storage data table 60 stored in the manufacturing management database includes a body number 61, a writing key code 62, a product name/type data 65, a manufacture date data 66, a factory data 67, a repairing data 69, and a shipping date data 68. The writing key code 62 is encrypted to be stored and a specific authentication is needed to confirm the encrypted data. The body number 61 is stored so as to correspond to the body number 51 stored in the RFID tag 1 of the product 7. The manufacturing management database storage data table 60 stores the production part data of the produced plural products 7 based on the body numbers 61. The manufacturing management server manages the product lifecycle data of the product 7 in the production part 10 based on the body number 61 which corresponds to the body number 51.

FIG. 9 is a distribution management database storage data table 70 showing data stored in a distribution management database of the embodiment of the present invention. The distribution management database is provided in the distribution management server. Referring to FIG. 9, the distribution management database storage data table 70 stored in the distribution management database includes a body number 71, a writing key code 72, a transportation company data 75, a shipping route data 76, a shipping date data 77 and a loaded date data 78. The writing key code 72 is encrypted to be stored and a specific authentication is needed to confirm the encrypted data. The body number 71 is stored to correspond to the body number 51 stored in the RFID tag 1 of the product 7. The distribution management database storage data table 70 stores the distribution part data of the distributed plural products 7 based on the body numbers 71. The distribution management server manages the product lifecycle data of the product 7 in the distribution part 20 based on the body number 71 that corresponds to the body number 51.

FIG. 10 is a sale and service management database storage data table 80 showing data stored in a sale and service management database of the embodiment of the present invention. The sale and service management database is provided in the sale and service management server. Referring to FIG. 10, the sale and service management database storage data table 80 stored in the sale and service management database includes a body number 81, a writing key code 82, a retailer data 85, a sales day data 86, a repair day data 87 and a repairing data 88. The writing key code 82 is encrypted to be stored and a specific authentication is needed to confirm the encrypted data. The body number 81 is stored to correspond to the body number 51 stored in the RFID tag 1 of the product 7. The sale and service management database storage data table 80 stores the sale and service part data of the sold and repaired plural products 7 based on the body number 81. The sale and service management server manages the product lifecycle data of the product 7 in the sale and service part 30 based on the body number 81 that corresponds to the body number 51.

FIG. 11 is a discarding and recycling management database storage data table 90 showing data stored in a discarding and recycling management database of the embodiment of the present invention. The discarding and recycling management database is provided in the discarding and recycling management server. Referring to FIG. 11, the discarding and recycling management database storage data table 90 stored in the discarding and recycling management database includes a body number 91, a writing key code 92, a collection trader data 95, a collection day data 96, a discarding trader data 97 and a discarding day data 98. The writing key code 92 is encrypted to be stored and a specific authentication is needed to confirm the encrypted data. The body number 91 is stored to correspond to the body number 51 stored in the RFID tag 1 of the product 7. The discarding and recycling management database storage data table 90 stores the discarding and recycling part data of the discarded and repaired plural products 7 based on the body number 91. The discarding and recycling management server manages the product lifecycle data of the product 7 in the discarding and recycling part 40 based on the body number 91 that corresponds to the body number 51.

Figure 12:
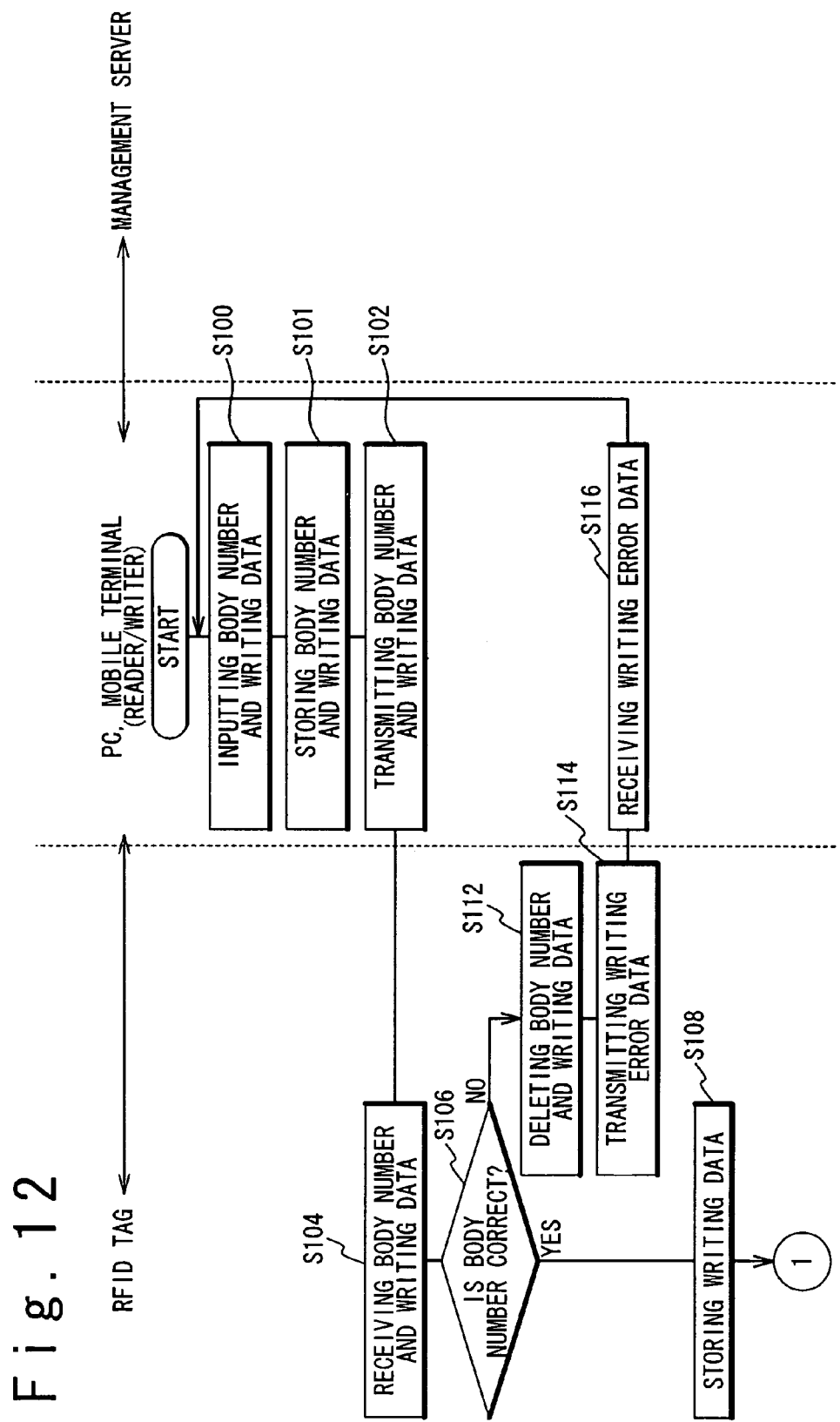
FIGS. 12 and 13 are flowcharts (FIG. 13 is a continuation of FIG. 12) showing an operation of the embodiment of the product lifecycle data management system of the present invention, in which data in the management servers are rewritten at the same time of the writing data in the RFID tag.
Figure 13:
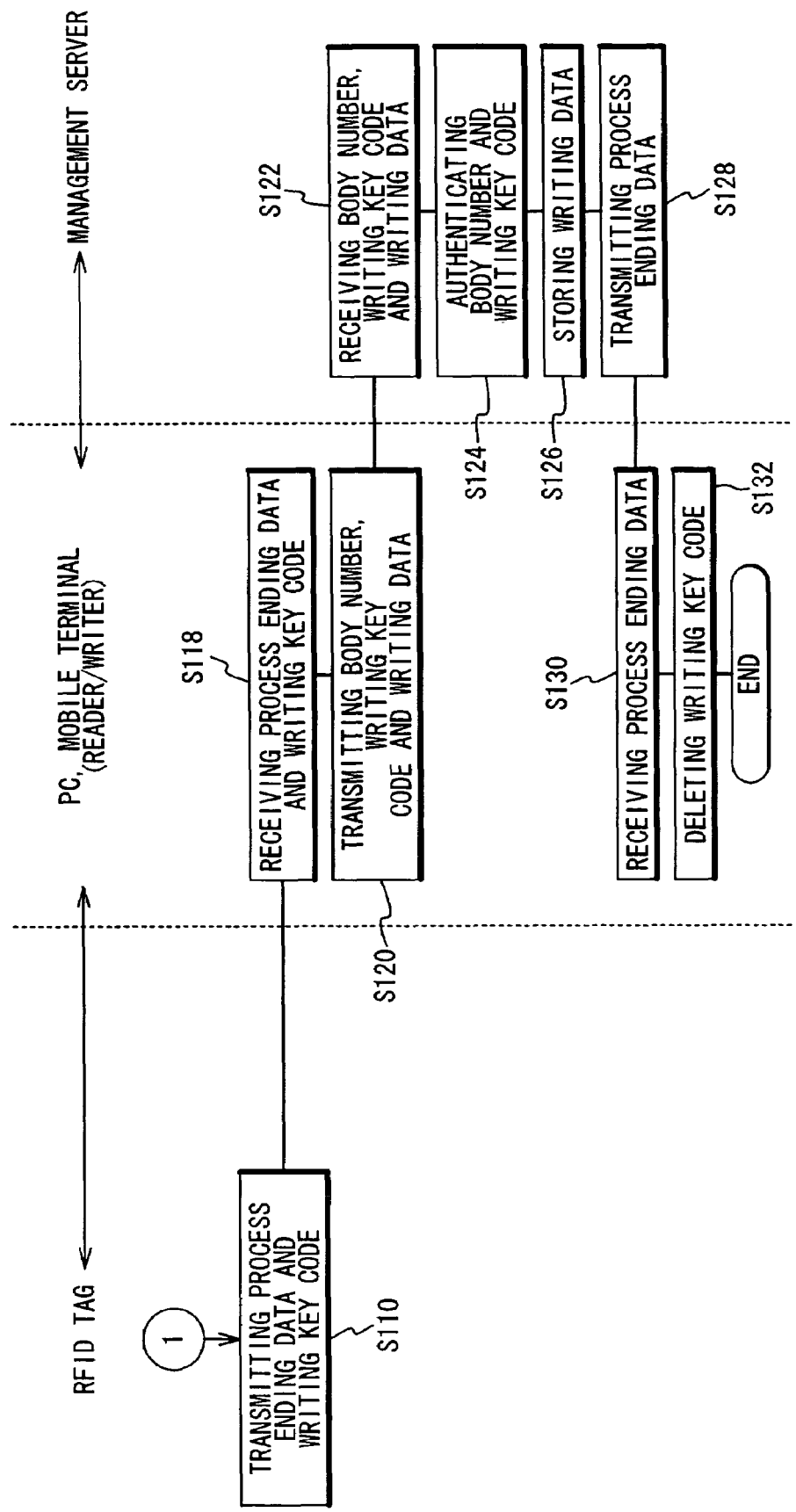

FIGS. 12 and 13 are flowcharts showing an operation of the embodiment of the product lifecycle data management system of the present invention. Here, this operation, in which the data in the management servers are rewritten at the same time of the writing data in the RFID tag 1, is described. Especially, this operation is appropriate for the case that the terminal in each hub and the management server in each part are in always-on connections with each other. FIGS. 12 and 13 also indicate an operation in case of the RFID tag 1 with a CPU that can carry out a judgement processing.

Referring to FIGS. 12 and 13, the operation begins when a new writing data produced by using the terminal is transmitted to the RFID tag 1. Since the operation of the production part 10 is similar to that of each part (20, 30 and 40), the operation of writing data in the production part 10 will be described as an example.

In a step S100, the data processing terminal 12 inputs a body number and a writing data for the RFID tag 1 from a writing data input unit 12*c*. Alternatively, the operator inputs a body number and a writing data for the RFID tag 1 by using a writing data input unit 12*c* of the data processing terminal 12. In a step S101, the inputted body number and the writing data are stored in the memory unit 12*b*. In a step S102, the data stored in the memory unit 12 is transmitted to the RFID tag 1 through the communication device 11.

In a step S104, the RFID tag 1 receives the data transmitted from the data processing terminal 12 by the antenna 1*b*. Then, the antenna 1*b* outputs the received data to the IC chip 1*a*. In a step S106, the IC chip 1*a* compares the body number included in the received data and the body number stored in the RFID tag 1. When both of the body numbers are identical as a result of the comparison, the process proceeds to a step S108. When the body numbers are not identical, the process goes to a step S112.

In the step S108, the RFID tag 1 confirms the correct input of the body number, and stores the writing data included in the transmitted data by the data processing terminal 12 to the memory area 1*aa*. In a step S110, the RFID tag 1 completes the storing of the writing data, and generates a process ending data. The RFID tag 1 transmits the process ending data and the writing key code stored in the memory area 1*aa* to the data processing terminal 12.

In the step S112, the RFID tag 1 receives the body number different from the body number which is stored in the memory area 1*aa* of the RFID tag 1. Then, the RFID tag 1 deletes the received different body number and the writing data. In a step S114, the RFID tag 1 completes the deleting data, and generates a writing error data. The RFID tag 1 transmits the writing error data to the data processing terminal 12 through the antenna 1*b*. In a step S116, the data processing terminal 12 receives the writing error data, and is on standby to wait for inputting a body number.

In a step S118, the data processing terminal 12 receives the process ending data and the writing key code transmitted from the RFID tag 1. The data processing terminal 12 can recognize the completion of the writing to the RFID tag 1 by confirming that the received data includes the process ending data. In a step S120, the data processing terminal 12 transmits the writing key code transmitted from the RFID tag 1, and the body number and the writing data stored in the memory unit 12b in the step S102 to the production part management server 3 in response to the recognition.

In a step S122, the production part management server 3 receives the body number, the writing key code and the writing data, which are transmitted from the data processing terminal 12. The data received by the production part management server 3 are outputted to the processing unit 3a. In a step 124, the processing unit 3a searches the writing key code, which corresponds to the received body number, from the database in the memory unit 2b. A code authentication is carried out by comparing the writing key code searched by the processing unit 3a and the writing key code transmitted from the data processing terminal 12. In a step S126, when both of the writing key codes are identical as a result of the code authentication, the processing unit 3a writes and stores the data in the production management database 3bb. In a step S128, the production part management server 3 generates the process ending data indicating the completion of rewriting the data in the database. The generated process ending data is transmitted to the data processing terminal 12 through the network in the production part 10.

In a step S130, the data processing terminal 12 receives the process ending data transmitted from the production part management server 3. The data processing terminal 12 recognizes the completion of the updating the database 3bb of the production part management server 3 by receiving the process ending data. In a step S132, the data processing terminal 12 deletes the writing key code, which is transmitted from the RFID tag 1, from the memory unit 12b based on the recognition, so that duplicated writing of data is prevented.

In the operation as mentioned above, the database requires a key, which is referred to as a "writing key code" in order to update data. The RFID tag 1 stores the writing key code, and the writing key code is received from the RFID tag 1 when the data in the RFID tag 1 is updated. As a result, a mismatch of the data in the database and the data in the RFID tag 1 can be prevented. Also, by storing an encrypted writing key code corresponding to each data written in the database, a higher level of security is achieved.

Figure 14:
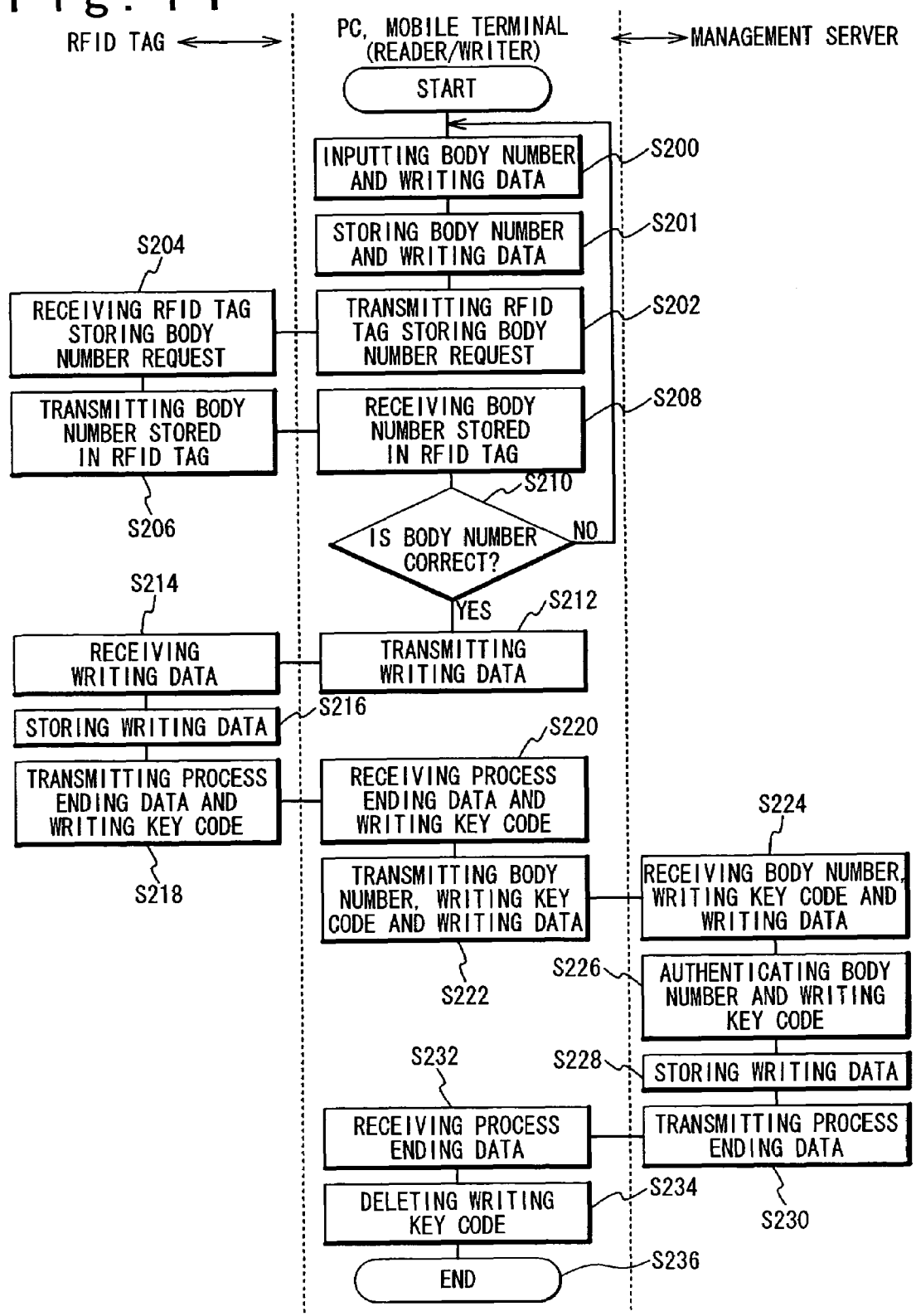
FIG. 14 is a flowchart showing another operation of the embodiment of the present invention for a configuration in which the RFID tag does not include a CPU.

FIG. 14 is a flowchart showing another operation of the embodiment of the present invention. In this embodiment, the RFID tag 1 does not include the CPU that can carry out the judgement processing. The operation shown in FIG. 14, which is the same as the operation in FIGS. 12 and 13, is appropriate for the case that the terminal in each hub and the management server in each part are in constant connection with each other. Referring to FIG. 14, the operation begins when a body number of a product 7 having the RFID tag 1 is inputted to a data processing terminal 12 in order to update data stored in the RFID tag 1.

In a step S200, a writing data input unit 12c of the data processing terminal 12 inputs a body number and a writing data for the RFID tag 1. Alternatively, the operator inputs a body number and a writing data for the RFID tag 1 by using a writing data input unit 12c of the data processing terminal 12. In a step S201, the inputted body number and the writing data are stored in a memory unit 12b. In a step S202, the data processing terminal 12 generates an RFID tag storing body number request in response to the input in the step 200, and transmits the RFID tag storing body number request to the RFID tag 1.

In a step S204, the RFID tag 1 receives the RFID tag storing body number request transmitted from the data processing terminal 12. The RFID tag 1 sends the received RFID tag storing body number request to an IC chip 1a. In a step S206, the IC chip 1a transmits the body number stored in the memory unit 1aa to the data processing terminal 12 through an antenna 1b.

In a step S208, the data processing terminal 12 receives the body number transmitted from the RFID tag 1 and outputs the received body number to a processing unit 12a. In a step S210, the processing unit 12a compares the body number stored in the RFID tag 1 and the body number stored in the memory unit 12b in the step S201. When both of the body numbers are identical as a result of the comparison, the process proceeds to a step S212. When both of the body numbers are not identical, the process returns to an initial state and is on standby for inputting a body number. In the step S212, the data processing terminal 12 read out a writing data to be written in the RFID tag 1 from the memory unit 12b, and transmits the writing data to the RFID tag 1.

In a step S214, the RFID tag 1 receives the data transmitted from the data processing terminal 12 and stores the writing data in the memory area 1aa. Processes after storing data in the step S216 (S216-S234) are same as those of the operation (S108-S132 except for S112-S116) shown in FIGS. 12 and 13 to carry out the management of the product lifecycle data of the product 7.

In this way, the product lifecycle data management system can be configured by using the RFID tag 1 with no CPU. An accident of system failure during the product lifecycle management caused by breaking down the CPU in the RFID tag 1 can be prevented by using the RFID tag 1 with no CPU.

Figure 15:
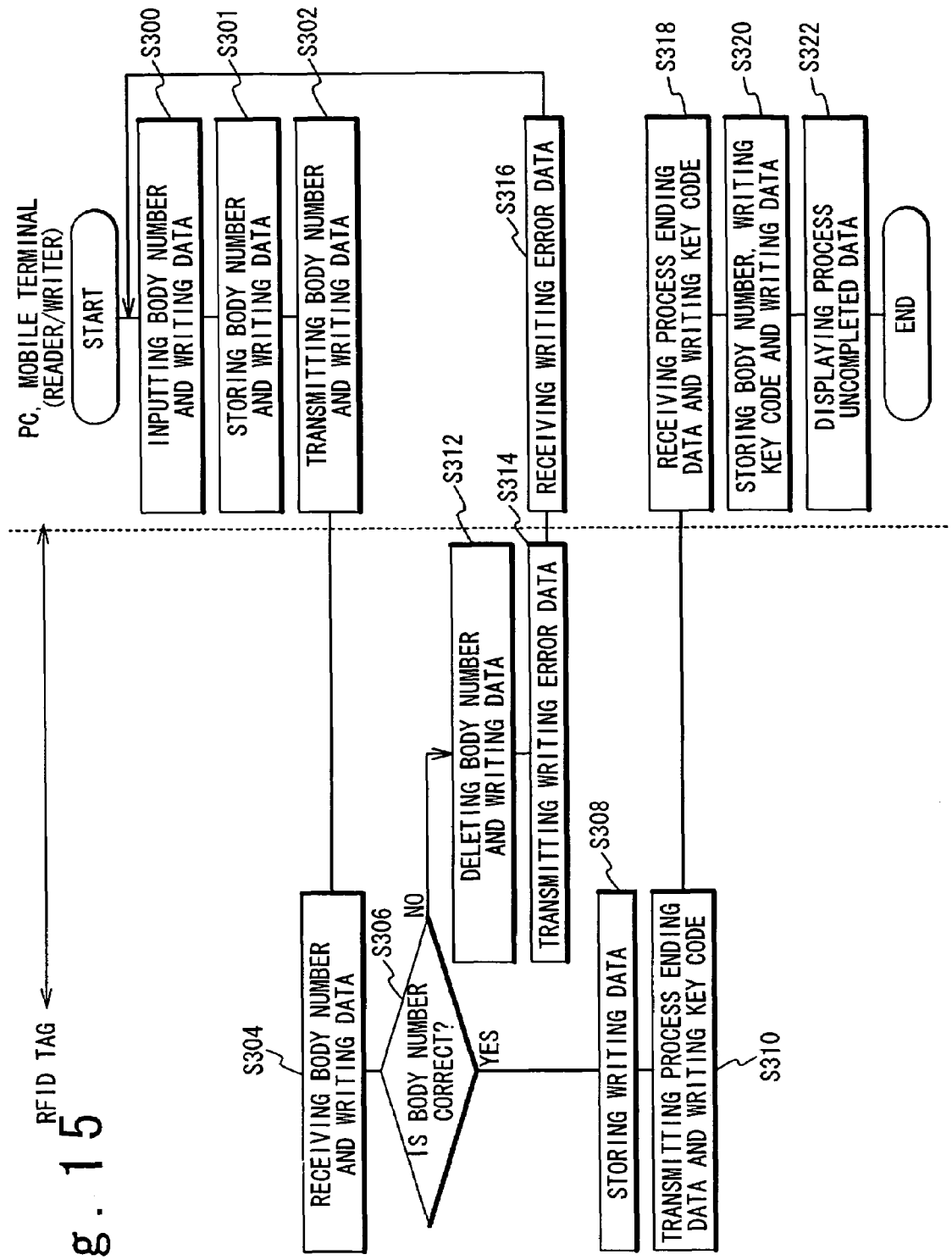
FIG. 15 is a flowchart showing another operation of the embodiment of the present invention, showing the communication between the terminals and an RFID tag in the case that data are rewritten in the management servers in a predetermined time after data is written to the RFID tag.

FIG. 15 is a flowchart showing another operation of the embodiment of the present invention. The operation in FIG. 15 indicates a communication between the terminals and an RFID tag 1 in case that data are rewritten in the management servers in a predetermined time after data is written to the RFID tag 1. Especially, the operation shown in FIG. 15 is appropriate for the case that the terminal in each hub and the management server in each part are not always in constant connection with each other. FIG. 15 also indicates an operation in the case that the RFID tag 1 includes the CPU that can carry out the judgement processing.

Referring to FIG. 15, the operation begins when a new writing data generated by using the terminal is transmitted to the RFID tag 1. In the sale and the service part 30, it is often impossible for the terminals in each hub and the management servers in each part to be in constant connection with each other. Here, the writing operation in the sale and the service part 30 exemplifies the operation in the following explanation.

In a step S300, a writing data input unit 31c of the mobile terminal 31 inputs a body number and a writing data for the RFID tag 1. Alternatively, the operator inputs a body number and a writing data for the RFID tag 1 by using a writing data input unit 31c of the mobile terminal 31. In a step S301, the inputted body number and the writing data are stored in a memory unit 31b. In a step S302, the data stored in the memory unit 31b is transmitted to the RFID tag 1 through the communication unit 31e.

In a step S304, the RFID tag 1 receives the data transmitted from the mobile terminal 31 by the antenna 1b. Then, the antenna 1b outputs the received data to an IC chip 1a. In a step S306, the IC chip 1a compares the body number indicated by the received data and the body number stored in the RFID tag 1. When both of the body numbers are identical as a result of the comparison, the process proceeds to a step S308. When the body numbers are not identical, the process goes to a step S312.

In a step S308, the RFID tag 1 confirms the correct input of the body number, and stores the writing data of the transmitted data by the mobile terminal 31 to the memory area 1aa. Then, in a step S310, the RFID tag 1 completes the storing of the writing data, and generates a process ending data. The RFID tag 1 transmits the process ending data and the writing key code stored in the memory area 1aa to the mobile terminal 31.

In the step S312, the RFID tag 1 receives the body number different from the body number stored in the memory area 1aa of the RFID tag 1. Then, the RFID tag 1 deletes the received different body number and the writing data. In a step S314, the RFID tag 1 completes the deleting data, and generates a writing error data. The RFID tag 1 transmits the writing error data to the mobile terminal 31 through the antenna 1b. In a step S316, the mobile terminal 31 receives the writing error data, and is on standby to wait for inputting a body number.

In a step S318, the mobile terminal 31 receives the process ending data and the writing key code transmitted from the RFID tag 1. The mobile terminal 31 can recognize the completion of the writing to the RFID tag 1 by confirming that the received data includes the process ending data. In a step S320, the mobile terminal 31 stores the writing key code transmitted from the RFID tag 1, in addition to the body number and the writing data which are stored in the step S301 to the memory unit 31b in response to the recognition. The processing unit 31a generates a process uncompleted data in response to the completion of the storing data. In a step S322, the mobile terminal 31 displays the process uncompleted data at a display unit 31d. The displaying of the process uncompleted data continues until a completion of updating the database 5bb in the management server.

In this way, even if the data of the management server is rewritten in a predetermined time after the writing data to the RFID tag 1, an accident in which updating data of the management server is forgotten can be effectively prevented.

FIG. 16 is a flowchart showing another operation of the embodiment of the present invention. The operation in FIG. 16 indicates a communication between the terminal and management server in case that data are rewritten in the management servers in a predetermined time after data is written to the RFID tag 1. Especially, the operation shown in FIG. 16 is appropriate for the case that the terminal in each hub and the management server in each part are not in always in constant connection with each other.

Referring to FIG. 16, in the step S324, the mobile terminal 31, which completed the data communication with the RFID tag 1 and is displaying the process uncompleted data, transmits the data stored in the memory unit 31b to the sale and service part management server 5.

In a step S326, the sale and service part management server 5 receives the data transmitted from the mobile terminal 31. Then, the received data is notified to the processing unit 5a. In a step 328, the processing unit 5a searches the writing key code, which corresponds to a body number stored in the memory unit 5b, in response to the receiving data in the step S326. The processing unit 5a compares the writing key code detected by the search and the writing key code transmitted from the mobile terminal 31. When both of the writing key codes are identical as a result of the comparison, the process proceeds to a step S330. When both of the writing key codes are not identical as a result of the comparison, the process goes to a step S334.

In a step S330, since both of the writing key codes are identical, the sale and service part management server 5 stores the writing data transmitted from the mobile terminal 31 to the memory unit 5b. In a step S332, the processing unit 5a generates the process ending data to notify an ending of processes to the mobile terminal 31 corresponding to the completion of the storing of the writing data. The generated process ending data is transmitted to the mobile terminal 31 through the network in the sale and service part 30.

In a step S334, both of the writing key codes are not identical. The sale and service part management server 5 deletes the transmitted body number, the writing key code and the writing data from mobile terminal 31 in response to the writing key codes being not identical. In a step S336, after completing the deleting of the received data, the sale and service part management server 5 generates a writing error data to notify the mobile terminal 31. The generated writing error data is transmitted to the mobile terminal 31 through the network in the sale and service part 30. In a step S338, the mobile terminal 31 receives the writing error data transmitted from the sale and service part management server 5, and is on standby to ready for transmitting data.

In a step S340, the mobile terminal 31 receives the process ending data transmitted from the sale and service part management server 5. The mobile terminal 31 can recognize a completion of updating of the database in the sale and service part management server 5 by receiving the process ending data. In a step S342, the mobile terminal 31 deletes the writing key code which is transmitted from the RFID tag 1, from the memory unit 31b in response to the recognition of the completing the update. In this way, a duplicated writing data to the management server can be prevented.

By above mentioned operation, the database requires a key, which is referred to a "writing key code" in order to update data to be stored, even if the terminal is not always in constantly connected to the management server. The RFID tag 1 stores the writing key code. Since the writing key code is received from the RFID tag 1 when the data in the RFID tag 1 is updated, a mismatch of the data in the database and the data in the RFID tag 1 can be prevented. Also, by storing an encrypted writing key code corresponding to each data written in the database, a higher level of security in the database is achieved.

FIG. 17 is a flowchart showing another operation of the embodiment of the present invention. The operation in FIG. 17 illustrates the communication between the terminal and the RFID tag 1 when data are rewritten in the management servers in a predetermined time after data is written to the RFID tag 1. Especially, the operation shown in FIG. 17 is appropriate when the terminal in each hub and the management server in each part are not always in constant connection with each other. FIG. 17 also indicates an operation of the present invention as a flowchart in the case that the RFID tag 1 does not include a determinable CPU.

Referring to FIG. 17, the operation begins when a new writing data generated by using the terminal is transmitted to the RFID tag 1. In the sale and the service part 30, it is often impossible for the terminal in each hub and the management server in each part to always be in constant connection with each other. Therefore, the writing operation in the sale and the service part 30 exemplifies the operation in following explanation.

In a step S400, a writing data input unit 31c of the mobile terminal 31 inputs a body number and a writing data for the RFID tag 1. Or the operator inputs a body number and a writing data for the RFID tag 1 by using a writing data input unit 31*c* of the mobile terminal 31. In a step S401, the inputted body number and the writing data are stored in a memory unit 31*b*. In a step S402, the mobile terminal 31 generates and transmits an RFID tag storing body number request to the RFID tag 1 in response to the input in the step S400.

In a step S404, the RFID tag 1 receives the RFID tag storing body number request transmitted from the mobile terminal 31. Then, the RFID tag 1 notifies the received request to an IC chip 1*a*. In a step S406, the IC chip 1*a* transmits the body number stored in the memory unit 1*aa* to the mobile terminal 31 through an antenna 1*b*.

In the step S408, the mobile terminal 31 receives the body number transmitted by the RFID tag 1. The mobile terminal 31 outputs the received body number to a processing unit 31*a*. Then, in a step S410, the processing unit 31*a* compares the outputted body number to be stored in the RFID tag 1 and the body number which is inputted from the writing data input unit 31*c* of the mobile terminal 31 and stored in the memory unit 31*b* at the step 400. When both of the body numbers are identical as a result of the comparison, the process proceeds to a step S412. When the body numbers are not identical, the process returns to an initial state and is on standby for inputting a body number.

In the step S412, the mobile terminal 31 reads out a writing data to be written in the RFID tag 1, and transmits the writing data to the RFID tag 1. In a step S414, the RFID tag 1 receives the data transmitted from the mobile terminal 31 and stores the writing data in the memory area. Processes after storing data in the step S416 (S416-S424) are same as those of the operation (S308-S322 except for S312-316) shown in FIG. 15 to carry out the management of the product lifecycle data of the product 7.

In this way, the product lifecycle data management system can be configured by using the RFID tag 1 with no CPU. An accident of system failure during the life cycle management caused by breaking down the CPU in the RFID tag, can be prevented by using the RFID tag with no CPU.

Although the present embodiments of the invention have been described in detail, it will be understood by persons skilled in the art that variations and modifications may be made thereto without departing from the spirit or essence of the invention. All such variations and modifications are intended to be encompassed by the scope of the claims appended hereto.

What is claimed is:

1. A product lifecycle data management system comprising:
   a data processing terminal;
   an RFID tag; and
   a management server;
   wherein said data processing terminal comprises:
      a first input unit which inputs a first identifier of a product and a product related data of said product,
      a first memory unit which stores said first identifier and said product related data,
      a first communication unit which transmits said first identifier and said product related data to said RFID tag,
      a first display unit which displays a first process ending data received from said RFID tag, wherein said first process ending data indicates an end of data processing in said RFID tag,
      a first data processing unit which transmits said first identifier, said product related data and a first authentication key data received from said RFID tag to said management server, and
      said first display unit displays a second process ending data received from said management server, wherein said second process ending data indicates an end of data processing in said management server,
   said RFID tag comprises:
      a second memory unit which compares said first identifier received from said data processing terminal with a second identifier of said product, and stores said product related data received from said data processing terminal when said first identifier is the same as said second identifier, wherein said second identifier is stored previously in said second memory unit,
      a second data processing unit which generates said first process ending data, and
      a second communication unit which transmits said first process ending data and said first authentication key data, said first authentication key data having been updated to correspond to said second identifier previously stored in said second memory unit,
   said management server comprises:
      a third memory unit which compares a first set comprising
         said first identifier, and
         said first authentication key data received from said data processing terminal,
         with a plurality of second sets comprising
         a third identifier, and
         a second authentication key data corresponding to said third identifier for a plurality of products,
      the third memory unit storing said product related data when said one of said second sets is the same as said first set, said plurality of second sets being previously stored in said third memory unit, and
      a third data processing unit which generates and transmits said second process ending data to said data processing terminal.

2. The product lifecycle data management system according to claim 1, wherein said first display unit displays a process uncompleted data from when displaying said first process ending data received from said RFID tag to when transmitting said first identifier, said product related data and said first authentication key data to said management server, said process uncompleted data indicates that said transmitting of the data to said management server is uncompleted.

3. The product lifecycle data management system according to claim 1, wherein said first authentication key data is set for each of data items of a data table stored in said RFID tag.

4. The product lifecycle data management system according to claim 1, wherein said RFID tag is an RFID tag including an IC chip and an antenna.

5. A product lifecycle data management system comprising:
   a data processing terminal;
   an RFID tag; and
   a management server;
   wherein said data processing terminal comprises:
      a first input unit which inputs a first identifier of a product and a product related data of said product;
      a first memory unit which stores said first identifier and said product related data,
      a first data processing unit which generates a transmission request indicating a request for transmitting a second identifier stored in said RFID tag,
      a first communication unit which transmits said transmission request to said RFID tag, a first display unit which displays a first process ending data received from said RFID tag, wherein said first process ending data indicates an end of data processing in said RFID tag, said first data processing unit compares said first identifier with said second identifier received from said RFID tag, said first communication unit transmits said product related data to said RFID tag when said first identifier is the same as said second identifier, said first data processing unit transmits said first identifier, said product related data and a first authentication key data received from said RFID tag to said management server, and said first display unit displays a second process ending data received from said management server, wherein said second process ending data indicates an end of data processing in said management server, said RFID tag comprises:
a second communication unit which transmits said second identifier to said data processing terminal in response to said transmission request, a second memory unit which stores said product related data received from said data processing terminal, a second data processing unit which generates said first process ending data, and said second communication unit transmits said first process ending data and said first authentication key data, said first authentication key data having been updated to correspond to said second identifier previously stored, said management server comprises:
a third memory unit which compares a first set comprising said first identifier and said first authentication key data received from said data processing terminal, with a plurality of second sets comprising a third identifier and a second authentication key data corresponding to said third identifier for a plurality of products, the third memory unit storing said product related data when said one of said second sets is the same as said first set, said plurality of second sets being previously stored in said third memory unit, and a third data processing unit which generates and transmits said second process ending data to said data processing terminal.

6. The product lifecycle data management system according to claim 5, wherein said first display unit displays a process uncompleted data from when displaying said first process ending data received from said RFID tag to when transmitting said first identifier, said product related data and said first authentication key data are transmitted to said management server, said process uncompleted data indicates that said transmitting of the data to said management server is uncompleted.

7. The product lifecycle data management system according to claim 5, wherein said first authentication key data is set for each of data items of a data table stored in said RFID tag.

8. The product lifecycle data management system according to claim 5, wherein said RFID tag is an RFID tag including an IC chip and an antenna.

9. A product lifecycle data management method comprising the steps of:
(a) receiving a first identifier of a product and a product related data of said product by a data processing terminal;

(b) storing said first identifier and said product related data by said data processing terminal;

(c) transmitting said first identifier and said product related data to an RFID tag by said data processing terminal;

(d) comparing said first identifier with a second identifier stored previously in said RFID tag by said RFID tag;

(e) storing said product related data when said first identifier is the same as said second identifier by said RFID tag;

(f) transmitting a first process ending data and a first authentication key data, said first authentication key data having been updated to correspond to said second identifier previously stored in said RFID tag by said RFID tag, wherein said first process ending data indicates an end of data processing in said RFID tag;

(g) displaying said first process ending data on a first display unit by said data processing terminal;

(h) transmitting said first identifier, said product related data and said first authentication key data to a management server by said data processing terminal;

(i) comparing a first set comprising said first identifier and said first authentication key data, with a plurality of second sets comprising a third identifier and a second authentication key data corresponding to said third identifier for a plurality of products by said management server, wherein said plurality of second sets is previously stored in said management server;

(j) storing said product related data when said one of said second sets is the same as said first set by said management server;

(k) transmitting a second process ending data to said data processing terminal by said management server, wherein said second process ending data indicates an end of data processing in said management server; and (l) displaying said second process ending data on said first display unit by said data processing terminal.

10. The product lifecycle data management method according to claim 9, wherein said (h) step comprises:
(h1) displaying a process uncompleted data on said first display unit by said data processing terminal until transmitting said first identifier, said product related data and said first authentication key data to said management server, said process uncompleted data indicates that said transmitting of the data to said management server is uncompleted.

11. A product lifecycle data management method comprising the steps of:
(a) receiving a first identifier of a product and a product related data of said product by a data processing terminal;

(b) storing said first identifier and said product related data by said data processing terminal;

(c) transmitting a transmission request to an RFID tag by said data processing terminal, said transmission request indicating a request for transmitting a second identifier stored in said RFID tag;

(d) transmitting said second identifier to said data processing terminal in response to said transmission request by said RFID tag;

(e) comparing said first identifier with said second identifier by said data processing terminal;

(f) transmitting said product related data to said RFID tag when said first identifier is the same as said second identifier by said data processing terminal;

(g) storing said product related data by said RFID tag;

(h) transmitting a first process ending data and a first authentication key data, said first authentication key data having been updated to correspond to said second identifier previously stored by said RFID tag, wherein said first process ending data indicates an end of data processing in said RFID tag;

(i) displaying said first process ending data on a first display unit by said data processing terminal;

(j) transmitting said first identifier, said product related data and said first authentication key data to said management server by said data processing terminal;

(k) comparing a first set said first identifier and said first authentication key data, with a plurality of second sets comprising a third identifier and a second authentication key data corresponding to said third identifier for a plurality of products by said management server, wherein said plurality of second sets is previously stored in said RFID tag;

(l) storing said product related data when said one of said second sets is the same as said first set by said management server;

(m) transmitting a second process ending data to said data processing terminal by said management server, wherein said second process ending data indicates an end of data processing in said management server; and (n) displaying said second process ending data on said first display unit by said data processing terminal.

12. The product lifecycle data management method according to claim 11, wherein said (j) step comprises:

(j1) displaying a process uncompleted data on said first display unit by said data processing terminal until transmitting said first identifier, said product related data and said first authentication key data to said management server, said process uncompleted data indicates that said transmitting of the data to said management server is uncompleted.

13. A computer program product embodied on a computer-readable medium and comprising code that, when executed, causes a computer to perform the following:

(a) receiving a first identifier of a product and a product related data of said product by a data processing terminal;

(b) storing said first identifier and said product related data by said data processing terminal;

(c) transmitting said first identifier and said product related data to a memory medium an RFID tag by said data processing terminal;

(d) receiving a first process ending data and a first authentication key data, said first authentication key data having been updated to correspond to a second identifier from said RFID tag by said data processing terminal, after said product related data is stored in said RFID tag when said first identifier is the same as said second identifier, wherein said second identifier is stored in said RFID tag, and said first process ending data indicates an end of data processing in said RFID tag;

(e) displaying said first process ending data on a first display unit by said data processing terminal;

(f) transmitting said first identifier, said product related data and said first authentication key data to a management server by said data processing terminal;

(g) receiving a second process ending data from said management server by said data processing terminal, after said product related data is stored in said management server in case that a first set comprising said first identifier and said first authentication key data, is the same as one of a plurality of second sets comprising a third identifier and a second authentication key data corresponding to said third identifier for a plurality of products, wherein said plurality of second sets is previously stored in said management server, and said second process ending data indicates an end of data processing in said management server; and (h) displaying said second process ending data on said first display unit by said data processing terminal.

14. The computer program product according to claim 13, wherein said (f) step comprises:

(f1) displaying a process uncompleted data on said first display unit by said data processing terminal until transmitting said first identifier, said product related data and said first authentication key data to said management server, said process uncompleted data indicates that said transmitting of the data to said management server is uncompleted.

15. A computer program product embodied on a computer-readable medium and comprising code that, when executed, causes a computer to perform the following:

(a) receiving a first identifier of a product and a product related data of said product by a data processing terminal;

(b) storing said first identifier and said product related data by said data processing terminal;

(c) transmitting a transmission request to an RFID tag by said data processing terminal, said transmission request indicating a request for transmitting a second identifier stored in said RFID tag;

(d) receiving said second identifier previously stored in said RFID tag from said RFID tag by said data processing terminal;

(e) comparing said first identifier with said second identifier by said data processing terminal;

(f) transmitting said product related data to said RFID tag when said first identifier is the same as said second identifier by said data processing terminal;

(g) receiving a first process ending data and a first authentication key data, said first authentication key data having been updated to correspond to said second identifier from said RFID tag by said data processing terminal, after said RFID tag stores said product related data, wherein said first authentication key data is previously stored in said RFID tag, and said first process ending data indicates an end of data processing in said RFID tag;

(h) displaying said first process ending data on a first display unit by said data processing terminal;

(i) transmitting said first identifier, said product related data and said first authentication key data to said management server by said data processing terminal;

(j) receiving a second process ending data from said management server by said data processing terminal, after said product related data is stored in said management server in case that a first set comprising said first identifier and said first authentication key data, is the same as one of a plurality of second sets comprising a third identifier and a second authentication key data corresponding to said third identifier for a plurality of products, wherein said plurality of second sets is previously stored in said management server, and said second process ending data indicates an end of data processing in said management server; and (k) displaying said second process ending data on said first display unit by said data processing terminal.

16. The computer program product according to claim 15, wherein said (i) step comprises:
  (i1) displaying a process uncompleted data on said first display unit by said data processing terminal until transmitting said first identifier, said product related data and said first authentication key data to said management server, said process uncompleted data indicates that said transmitting of the data to said management server is uncompleted.

17. A product lifecycle data management system, the system comprising a main server, a production part communicating with the main server, a distribution part communicating with the main server, a sale and service part communicating with the main server, and a discarding and recycling part communicating with the main server, wherein each of the production part, the distribution part, the sale and service part, and the discarding and recycling part comprises a product identification and tracking system that comprises:
  a data processing terminal;
  an RFID tag; and
  a management server, the management server communicating with the main server;
  wherein said data processing terminal comprises:
    a first input unit which inputs a first identifier of a product and a product related data of said product,
    a first memory unit which stores said first identifier and said product related data,
    a first communication unit which transmits said first identifier and said product related data to said RFID tag,
    a first display unit which displays a first process ending data received from said RFID tag, wherein said first process ending data indicates an end of data processing in said RFID tag,
    a first data processing unit which transmits said first identifier, said product related data and a first authentication key data received from said RFID tag to said management server, and
    said first display unit displays a second process ending data received from said management server, wherein said second process ending data indicates an end of data processing in said management server,
  said RFID tag comprises:
    a second memory unit which compares said first identifier received from said data processing terminal with a second identifier of said product, and stores said product related data received from said data processing terminal when said first identifier is the same as said second identifier, wherein said second identifier is stored previously in said second memory unit,
    a second data processing unit which generates said first process ending data, and
    a second communication unit which transmits said first process ending data and said first authentication key data, said first authentication key data having been updated to correspond to said second identifier previously stored in said second memory unit,
  said management server comprises:
    a third memory unit which compares a first set comprising
      said first identifier, and
      said first authentication key data received from said data processing terminal,
    with a plurality of second sets comprising
      a third identifier, and
      a second authentication key data corresponding to said third identifier for a plurality of products,
    the third memory unit storing said product related data when said one of said second sets is the same as said first set, said plurality of second sets being previously stored in said third memory unit, and
    a third data processing unit which generates and transmits said second process ending data to said data processing terminal.

* * * * *